(12) United States Patent
Silver

(10) Patent No.: US 12,198,135 B2
(45) Date of Patent: Jan. 14, 2025

(54) BLOCKCHAIN TRANSACTION APPROVAL USING OFFLINE PRIVATE ENCRYPTION KEYS

(71) Applicant: Pyxelchain Technology Corporation, Sheridan, WY (US)

(72) Inventor: Richard E. Silver, Fall Creek, OR (US)

(73) Assignee: Pyxelchain Technology Corporation, Sheridan, WY (US)

( * ) Notice: Subject to any disclaimer, the term of this patent is extended or adjusted under 35 U.S.C. 154(b) by 267 days.

(21) Appl. No.: 18/051,739

(22) Filed: Nov. 1, 2022

(65) Prior Publication Data
US 2023/0162188 A1 May 25, 2023

Related U.S. Application Data

(60) Provisional application No. 63/274,278, filed on Nov. 1, 2021.

(51) Int. Cl.
*G06Q 20/40* (2012.01)
*G06K 7/14* (2006.01)
(Continued)

(52) U.S. Cl.
CPC ......... *G06Q 20/401* (2013.01); *G06K 7/1417* (2013.01); *G06Q 20/3674* (2013.01); *G06Q 20/3829* (2013.01); *G06Q 20/389* (2013.01)

(58) Field of Classification Search
CPC ............. G06Q 20/401; G06Q 20/3674; G06Q 20/3829; G06Q 20/389; G06K 7/1417
See application file for complete search history.

(56) References Cited

U.S. PATENT DOCUMENTS 10,762,481 B2 * 9/2020 Haldenby .............. G06Q 20/20
2016/0012465 A1 * 1/2016 Sharp .................... G06Q 20/321
705/14.17
(Continued)

FOREIGN PATENT DOCUMENTS

WO WO-2013166507 A1 * 11/2013 ............. G06Q 20/02

*Primary Examiner* — Radu Andrei
*Assistant Examiner* — Nakia Leffall-Allen
(74) *Attorney, Agent, or Firm* — K&L Gates LLP

(57) ABSTRACT

A distributed storage and computing architecture and associated usage techniques are described for providing efficient and secure management of blockchain transaction approval using private encryption keys stored offline, such as via an offline device that stores offline private encryption key(s) and that communicates with an online device using only encoded QR codes and without any inter-device electronic transmissions or communications, or otherwise using private encryption keys stored offline. In some situations, automated operations to manage a transaction approval include using complementary software applications executing on an offline device storing offline private encryption key(s) and on an online device, with the offline device using its stored offline private encryption key(s) to approve and cryptographically sign a transaction without exposing those keys to any online devices, and with the online device receiving the transaction approval information and storing corresponding transaction information on a public blockchain storage system.

20 Claims, 16 Drawing Sheets

(51) Int. Cl.
*G06Q 20/36* (2012.01)
*G06Q 20/38* (2012.01)

(56) References Cited

U.S. PATENT DOCUMENTS

| | | | |
|---|---|---|---|
| 2018/0315027 A1* | 11/2018 | Kumar | G06Q 20/3278 |
| 2021/0256508 A1* | 8/2021 | Moy | G06Q 20/02 |
| 2022/0005022 A1* | 1/2022 | Tu | G06Q 20/02 |

* cited by examiner

BLOCKCHAIN TRANSACTION APPROVAL USING OFFLINE PRIVATE ENCRYPTION KEYS

CROSS-REFERENCE TO RELATED APPLICATIONS

This application claims benefit under 35 U.S.C. § 119 (e) to U.S. Provisional Application No. 63/274,278 filed Nov. 1, 2021, entitled "BLOCKCHAIN TRANSACTION APPROVAL USING OFFLINE PRIVATE ENCRYPTION KEYS," the contents of which is herein incorporated by reference in its entirety.

TECHNICAL FIELD

The following disclosure relates generally to approving blockchain transactions using private encryption keys stored offline, such as by using an offline device that stores one or more offline private encryption keys and that communicates with an online device to cryptographically sign a blockchain transaction using only encoded QR (quick response) codes and without any inter-device electronic transmissions or other electronic communications, to cause the online device to transmit and store corresponding blockchain transaction information on a blockchain storage system.

BACKGROUND

Blockchain tokens can be used for various purposes, including to correspond to a monetary value, to represent an associated physical item or digital item, etc., and a variety of types of information may be stored on blockchain storage systems, including related to blockchain transactions. However, various difficulties exist in managing blockchain transactions, including protecting private encryption keys.

DETAILED DESCRIPTION

Figure 1A:
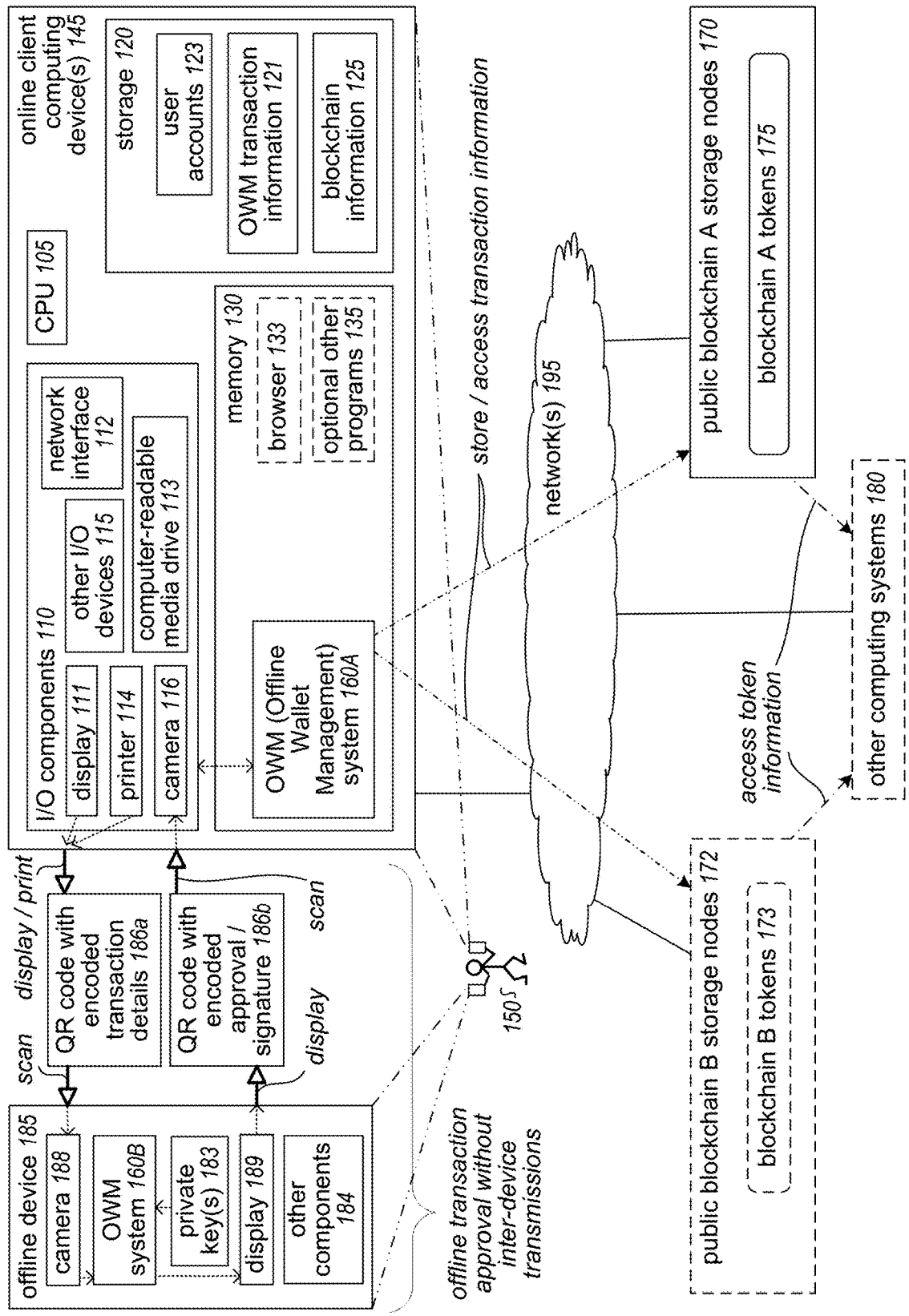
FIG. 1A is a network diagram illustrating an example environment in which an embodiment of an Offline Wallet Management (OWM) system is provided and used for managing blockchain transaction approval using an offline device that communicates with an online device using only encoded QR codes and without any inter-device transmissions, including illustrating example computing systems suitable for executing an embodiment of such a system.

A distributed storage and computing architecture and associated automated techniques are described for providing efficient and secure management of blockchain transaction approval using private encryption keys stored offline, such as by using an offline device that stores one or more offline private encryption keys and that communicates with an online device using only encoded QR (quick response) codes and without any inter-device electronic transmissions or other electronic communications, or by otherwise using offline storage of private encryption keys. In at least some embodiments, automated operations are performed to manage transaction approval by using complementary software applications that execute on an offline device that stores one or more offline private encryption keys and on an online device that is communicatively coupled to a public blockchain storage system, such as to enable the offline device to use its stored offline private encryption key(s) to approve and cryptographically sign a transaction without exposing the stored private encryption keys to any online devices, and to enable the online device to receive the transaction approval information and to transmit and store corresponding transaction information on the public blockchain storage system. In addition, in at least some embodiments, further automated operations are performed involving allocating an amount and/or type of ownership rights to a particular recipient (e.g., that may be redeemed by that recipient under specified circumstances). The described techniques are, in at least some embodiments, performed at least in part by automated operations of a computer-implemented Offline Wallet Management (OWM) system, as discussed in greater detail below.

In at least some embodiments, one or more publicly accessible blockchain storage systems (e.g., distributed blockchain storage) are used by the OWM system to store blockchain transaction information and optionally other data, such as by using a bitcoin-based blockchain storage system and/or an Ethereum-based blockchain storage system and/or a Flow-based blockchain storage system and/or another type of blockchain storage system—in at least some such embodiments, the OWM system may mint a new blockchain block on at least one type of blockchain storage system to store information about an approved transaction. Such transactions may have various forms, including to transfer a designated amount of a cryptocurrency or an indicated non-fungible token from a sender to a recipient, with non-exclusive examples of such a cryptocurrency including Bitcoin, Ethereum, Litecoin, Ripple, Dogecoin, etc., and with non-exclusive examples of such non-fungible tokens including an Ethereum ERC-721 non-fungible token; an Ethereum ERC-1155 non-fungible token; an Ethereum ERC-20 fungible token; a Flow non-fungible token; a bitcoin non-fungible or fungible token; a Cardano non-fungible or fungible token; a DOT non-fungible or fungible token;

any non-fungible or fungible token implemented as a smart contract with specific instructions, such as a program, to be executed or otherwise implemented when specified conditions occur; etc.), including to incorporate various types of information, and to be implemented as smart contracts in at least some such embodiments.

In addition, various types of automated operations may be performed by an OWM system as part of approving a blockchain transaction. As noted above, in at least some embodiments, the automated operations may include using complementary software applications that execute on offline and online devices of a user, such as an offline device that stores one or more offline private encryption keys for the user, and an online device of the user that includes transmission capabilities to connect it with at least one public blockchain storage system. Such automated operations may include interacting with the user on one or both devices to obtain details about a transaction to be performed, optionally after the user first provides access information to confirm their authorization to use that device (e.g., a password, biometric verification, etc.)—if at least some of the interactions to obtain the transaction details involve the online device (e.g., the user specifies the transaction details while interacting with the online device), the online device may then encode the transaction details that it receives in a format that can be transferred to the offline device without any electronic transmissions or other electronic communications (referred to at times herein more generally as "any electronic communications"), such as by using a QR code that can be displayed on the online device or printed by the online device and that includes data about the transaction (referred to generally at times herein as a "transaction data QR code"), or using another encoding format that can be displayed or printed (e.g., another type of visual code that encodes such data, with a non-exclusive example being a barcode, such as by using one or more of Code 39, Code 128, Interleaved 2 of 5, Universal Product Codes, International Article Number, PDF417, Data Matrix, etc.). A camera of the offline device may then be used to scan the transaction data QR code or other transaction data encoding format to receive the transaction details, and in some situations the offline device may further receive interactive approval of the user to proceed with the transaction (e.g., after displaying transaction details on the offline device to the user from the decoded transaction data QR code or other transaction data encoded information)—in other situations, the offline device may proceed to automatically approve the transaction without such explicit user approval, such as if the scanning of the transaction data QR code or other transaction data encoded information is treated as implicit approval by the user of the transaction (e.g., depending on a prior configuration of approval settings by the user, based on a default or fixed setting of the OWM system, etc.). Once the offline device has approved the transaction, it uses one or more private encryption keys of the user that are stored offline to sign the transaction, and then encodes the transaction approval in a format that can be transferred to the online device without any electronic communications, such as by using a QR code that can be displayed on the offline device or printed by the offline device (referred to generally at times herein as a "transaction approval QR code"), or using another transaction approval encoding format that can be displayed or printed. A camera of the online device may then be used to scan the transaction approval QR code or other transaction approval encoding format to receive the transaction approval, and to transmit and store corresponding signed transaction information on a public blockchain storage system. In this manner, the online device may receive and store details of a transaction that is signed using one or more private encryption keys of the user, without those private encryption keys ever being exposed to the online device (or to any other device that uses electronic communications to interact with other devices), thus providing greater security for those private encryption keys than in other storage and communication mechanisms in which such private encryption keys are accessible on an online device and thus subject to possible interception or theft, as well as greater speed and ease of use relative to other types of offline storage of private encryption keys on hardware wallets or other offline storage mechanisms.

The online device and offline device may have various forms in various embodiments. For example, the offline device may lack any active electronic communication capabilities (e.g., any wireless or physical connection, such as via wire, cable, hardware port or port adapter, etc.) for at least the period in which it is used to approve a transaction, such as a smartphone device (with all of its electronic communication capabilities disabled) or dedicated hardware device (e.g., without any electronic communication capabilities, with all of its electronic communication capabilities disabled, etc.), and the online device may have electronic communication capabilities (e.g., a connection to the Internet or other computer network) and be in the form of a smartphone or desktop computer or any other computing device. In addition, the offline device may access the one or more private encryption keys of the user that are stored offline in various manners in various embodiments. For example, the offline device may locally store some or all such private encryption keys on the offline device, such as to act as a permanent offline hardware cryptographic wallet (e.g., if the offline device is never connected via any electronic communications to any online devices). Alternatively, in some embodiments, one or more such offline private encryption keys are stored in another offline format and temporarily accessed by the offline device in order to sign an approved transaction, with a transitory copy of such a private encryption key on the offline device then deleted from the offline device (e.g., before the signed transaction details are communicated to the online device via transaction data QR code or other transaction data encoded format)—as one non-exclusive example, such a private encryption key may be stored on one or more paper wallets (e.g., as an encrypted QR code or other encoded QR code, referred to generally at times herein as a "private key QR code"; or other private key encoded format on a piece of paper or other medium on which the information is printed or otherwise visible) that are scanned by the offline device to access the private encryption key. For further security, a private encryption key may in some embodiments be stored across multiple paper wallets, such that all such paper wallets or a designated subset of the paper wallets must be accessed and have their information combined to reconstruct the private encryption key (e.g., using an erasure code that separates the private encryption key into M separate parts that can be recovered from any K of those parts, where $1<K<M$). In a similar manner, in at least some embodiments, the OWM system may separate the transaction data for a transaction across multiple transaction data QR codes or other transaction data encoding formats (e.g., such that all such multiple transaction data QR codes or a designated subset of those multiple transaction data QR codes must be accessed and have their information combined to reconstruct the transaction data for the transaction), and/or the OWM system may separate the transaction approval data for a transaction across multiple transaction approval QR codes or other transaction approval encoding formats (e.g., such that all such multiple transaction approval QR codes or a designated subset of those multiple transaction approval QR codes must be accessed and have their information combined to reconstruct the transaction approval data for the transaction).

In addition, in at least some embodiments, the automated operations of the OWM system may include using one or more private encryption keys of a user that are stored offline to approve a transaction, but without using an offline device. Such automated operations may include interacting with the user on an online device to obtain details about a transaction to be performed, optionally after the user first provides access information to confirm their authorization to use that device (e.g., a password, biometric verification, etc.). A camera of the online device may then be used to scan a private key QR code or other private key encoding format that provides offline storage of the one or more private encryption keys, such as using one or more paper wallets that store each such private encryption key. The online device may in some situations then receive approval of the user on the online device to approve the transaction (e.g., after displaying transaction details on the online device to the user)—in other situations, the online device may proceed to automatically approve the transaction without such explicit user approval, such as if the scanning of the private key QR code or other private key encoded information to provide access to the private encryption key(s) is treated as implicit approval by the user of the transaction (e.g., depending on a prior configuration of approval settings by the user, based on a default or fixed setting of the OWM system, etc.). After the transaction is approved, the one or more private encryption keys are used to sign the transaction, with a transitory copy of such a private encryption key on the online device then deleted from the online device (e.g., before the signed transaction details are communicated from the online device for storage on blockchain storage). In this manner, the online device may receive and store details of a transaction that is signed using one or more private encryption keys of the user, with the transaction automatically approved and signed based on access being provided to one or more private encryption keys that are stored offline and immediately deleted from the online device after use for cryptographic signing, thus providing greater security for those private encryption keys than in other storage and communication mechanisms in which such private encryption keys are accessible on an online device and thus subject to possible interception or theft, and greater speed and ease of use relative to other uses of paper wallets.

In addition, in at least some embodiments and situations, the OWM system may support multi-party transactions in which two or more users must approve and sign a transaction before the transaction is completed and valid. In such embodiments, one or more criteria may be specified for such a multi-party transaction, such as approval by all of multiple indicated users, by a designated subset quantity of multiple indicated users (e.g., any three of five indicated users), or any other specified criteria, and the OWM system may perform automated operations to enforce such criteria. In such embodiments, the OWM system may perform automated operations to facilitate such multi-party transactions, such as sending notifications to the multiple indicated users, such as by using other described techniques to enable one or some or all such multiple indicated users to each use an offline device or other offline storage of that user's one or more private encryption keys to perform their portion of approval of the transaction, etc.

As noted above, in some embodiments and situations, the OWM system may execute and store information about approved transactions of various types, including in some embodiments and situations to transfer cryptocurrencies between cryptographic wallets of a sender and a recipient, to transfer ownership of a non-fungible token or other item (e.g., a physical item), etc. As part of doing so, the OWM system may provide and maintain such cryptographic wallets in some embodiments, or otherwise obtain and store information about particular existing and potential recipients in other corresponding ownership accounts (e.g., information about the recipients, about their owned items, about payment sources of the recipients, etc.), and use such information as part of its operations—in some embodiments and situations, a potential transaction may be based in part or in whole on a potential sender and/or recipient having a current balance of one or more redemption credits issued by the OWM system (e.g., that are used in part or in whole as part of a price for performance of a transaction), with such redemption credits being issued to recipients and/or replenished after use according to defined redemption credit criteria, and with one non-exclusive example of use of redemption credits being available in U.S. Provisional Patent Application No. 63/235,035, filed Aug. 19, 2021 and entitled "Blockchain-Based Resource Management", which is incorporated herein by reference in its entirety. In addition, users may use various types of devices to interact with the OWM system in various embodiments and situations, including online computing devices that may interact with other computing systems (e.g., over one or more computer networks, such as to interact with one or more online client computing devices that implement additional functionality of the OWM system and/or of another related system)—such online client devices may include, for example, desktop computers, laptop computers and tablet computers and other portable computers, smart phone computing devices, etc.

The described techniques provide various benefits in various embodiments, including that transaction information is stored by the OWM system on publicly accessible blockchain storage and may be retrieved, inspected and validated by anyone to provide transparent information about such a transaction, while protecting the security of the one or more private encryption key(s) used to sign the transaction (e.g., via use of an offline device in such a manner that no online device ever obtains access to the one or more private encryption keys), and providing greater speed and ease of use relative to other types of offline storage of private encryption keys on hardware wallets or other offline storage mechanisms. Such described techniques further provide benefits in allowing improved control over access to transaction information and other related information, including to significantly reduce the computing power used and/or time used in specified circumstances, and to provide greater control over such transactions based on specified transaction criteria. Various other benefits are also provided by the described techniques, some of which are further described elsewhere herein.

For illustrative purposes, some embodiments are described below in which specific types of operations are performed, including with respect to particular types of transactions, types of transaction participants, types of transaction approval processes, types of stored data, types of devices, etc. For example, while the described techniques may be used in some embodiments to control automated operations of the OWM system for approving a transaction by one or more users using private encryption keys of the user(s) that are stored offline (e.g., on an offline device), the described techniques may be used in other embodiments to control other types of uses of private encryption keys and/or other confidential information, and/or more generally to control access to functionality associated with verified ownership or control of such private encryption keys and/or other confidential information (e.g., as sign-on or login information or to otherwise access restricted functionality and/or information). Furthermore, while public blockchain storage is used in some examples below to store transaction information, other types of storage (e.g., private blockchain storage; permissioned blockchain storage; non-blockchain storage, such as single-system storage or distributed storage or peer-to-peer storage or cloud storage; etc.) may be used in other embodiments to store the same or similar types of information (using blockchain blocks or in other forms), whether in addition to or instead of public blockchain storage. These examples are provided for illustrative purposes and are simplified for the sake of brevity, and the inventive techniques may be used in a wide variety of other situations, including with other types of transactions, other types of transaction participants, other types of transaction approval processes, other types of stored data, etc., some of which are discussed below-accordingly, it will be appreciated that the described techniques are not limited to use with the example embodiments discussed below.

FIG. 1A illustrates an example environment in which an embodiment of an Offline Wallet Management (OWM) system is provided and used for managing blockchain transaction approval using an offline device that communicates with an online device using only encoded QR codes and without any inter-device transmissions, including illustrating example computing systems suitable for executing an embodiment of such a system. In particular, FIG. 1A illustrates one or more online client computing devices 145 that each executes a component of an embodiment of an Offline Wallet Management (OWM) system 160 (in particular an OWM system component 160A that controls operations of the online device), while a separate component of the embodiment of the OWM system (in particular an OWM system component 160b that controls operations of a separate offline device 185), with the OWM system 160 (in this case, using both components 160A and 160B) performing automated operations to manage blockchain transaction approval. While not illustrated in FIG. 1A, in some embodiments an additional component or other embodiment of the OWM system executes elsewhere (e.g., on one or more server computing systems 190, not shown) to manage interactions with multiple such online computing devices 145, including to manage multi-party transactions as described elsewhere herein. In this example embodiment, the online client computing devices 145 each includes various hardware components, as well as stored data and executable software instructions to program or otherwise configure the online client computing device(s) and/or their hardware components to perform some or all of the described techniques. In particular, the example online client computing device 145 includes one or more hardware central processing unit ("CPU") processors 105, various hardware input/output ("I/O") components 110, storage 120, and memory 130, with the I/O components in this example embodiment including a display 111, a network connection interface 112, a computer-readable media drive 113, and other I/O devices 115 (e.g., wireless or attached keyboards, mice or other pointing devices, microphones, speakers, cameras, other sensors, etc.). Other types of hardware components may additionally be present (e.g., other processors, such as a GPU, or graphics processing unit; a GPS, or global positioning system, transceiver and/or other location-determination sensors; one or more IMUs, or internal measurement units; etc.), but are not illustrated in this example. Each of the other computing systems and/or devices and/or storage nodes (including the offline device 185; one or more service computing and/or storage systems, not shown; etc.) may similarly include some or all such hardware components (and optionally additional hardware components), such as for an offline device to include a CPU and memory and storage and I/O components other than a network interface (or to have a network interface that is disabled or otherwise not in use), but the details are not illustrated herein for the other computing systems for the sake of brevity.

In addition to the online client computing devices 145 and offline device(s) 185, FIG. 1A further illustrates multiple public blockchain storage nodes 170 of a first type of blockchain storage on which tokens and other types of information (e.g., blockchain blocks with transaction details) are stored, optionally multiple public blockchain storage nodes 172 for one or more second types of blockchain storage different from the first blockchain storage type on which similar types of information are optionally stored, and optionally other computing systems 180, with the various computing systems, devices, and storage nodes other than the offline device(s) 185 interacting in this example via one or more networks 195—some or all client computing devices 145 may each further have one or more associated users 150 for that respective client device, including in some situations and embodiments to direct or otherwise control actions of that respective client device, with such a user 150 further having at least one associated offline device 185 to use for approval transactions using one or more private encryption keys stored offline (e.g., private keys 183 stored on such an offline device 185). In addition, the network 195 may, for example, include portions of the Internet, a private network (e.g., a corporate network), a cellular network, or any other networks, including combinations of one or more such networks. The client computing devices 145 may also have various forms (e.g., a laptop, desktop, smart phone, tablet, etc.), and may optionally execute other programs in addition to the OWM system 160A, such as an optional browser 133 and/or other optional programs 135. In addition, the various computing systems, devices and storage nodes other than the offline device(s) 185 may be connected to other systems and devices that are not illustrated, including through one or more networks such as the Internet or via the Web.

During its operation, the OWM system 160A may store and use various information on storage 120 and/or elsewhere, such as in one or more databases or other storage structures, including information 121 about transactions (e.g., one or more users or other parties involved, optionally transaction-related criteria and associated instructions used to manage transaction approval, etc.), information 123 about ownership accounts 123 associated with various users (e.g., information about current and/or past ownership of one or more cryptographic coins or non-fungible tokens or other items acquired via interactions with the OWM system, one or more amounts of resource access replenishment credits associated with a particular account of a particular user, etc.), and information 125 about blockchain information (e.g., about blockchain transactions performed by the OWM system).

In addition, each offline device 185 of a user 150 in the illustrated embodiment includes a camera or other scanner component 188, one or more stored private keys 183 of the user, a display 189 (and/or printer, not shown), an embodiment 160B of a portion of the OWM system that controls operations on the offline device involving approval of blockchain transactions (e.g., executing in memory, not shown, of the offline device by operations of a CPU, not shown, of the offline device), and various other components 184 (e.g., a CPU, memory, storage, I/O components, etc.).

In the illustrated example embodiment, the user 150 determines to initiate a blockchain transaction, and interacts with a corresponding online client computing device 145 of the user to provide the transaction details, although the client computing device 145 may obtain such transaction details in other manners in other embodiments, including to be transmitted the transaction details from another computing system (not shown) that operates one or more other components of the OWM system, including as part of a multi-party transaction as discussed in greater detail elsewhere herein. As part of the user interactions with the online client computing device 145, the OWM system 160A may optionally use an account of the user maintained by the OWM system, in some cases after the user provides a password or other access information. The OWM system 160A on that client computing device 145 then generates a transaction data QR code 186a that includes the transaction details in an encoded format (e.g., an encrypted format) and uses the display 111 and/or printer 114 of that client computing device to display and/or print, respectively, the encoded transaction data QR code—in other embodiments, the transaction details may be encoded by the OWM system 160A in formats other than a QR code. In at least some such embodiments, data encoded in the QR code may include information about a transfer of a specified amount of cryptocurrency (e.g., from the user 150 to a designated recipient, to the user 150 from a designated sender, etc.) or other details of the transaction, and may further include additional metadata (e.g., an address to which and/or from which to transfer cryptocurrency, a corresponding wallet name, cryptographic transaction 'gas', etc.)—as one non-exclusive example, Scrypt may be used to encrypt data encoded in the QR code, and a data format such as JSON (JavaScript Object Notation) and/or YAML (YAML Ain't Markup Language) may be used to encode/store data, with the data optionally compressed. The user 150 then uses his or her offline device 185 to scan that transaction data QR code, such as by using the camera 188 of that offline device, and the OWM system 160B on that offline device then uses those transaction details and one or more private keys 183 stored on the offline device to, after approval of the transaction, generate a transaction approval QR code 186b that includes signed transaction information for the approved transaction, and displays or prints that encrypted transaction approval information using a display 189 of that offline device and/or a printer (not shown) of that offline device, respectively. As with interactions with the online client computing device, the OWM system 160B may perform its interactions with the user only after optionally receiving a password or other access information from the user. The user 150 than provides that generated transaction approval QR code 186b to the OWM system 160A of the online client computing device 145 (e.g., by scanning the QR code using a camera 116 of the online client computing device 145), which accesses one or more public blockchain storage nodes to store corresponding transaction information (e.g., the public blockchain A storage nodes 170), optionally after the user confirms the transaction completion via one or more interactions with the online client computing device 145. In addition, while the online computing device 145 and/or offline device 185 may obtain explicit approval or confirmation from the user to proceed with the actions involved in completing and transmitting the transaction information and/or involved in approving the transaction to cause the signed transaction information to be provided, respectively, in other embodiments one or more such explicit approvals are not used. Furthermore, in at least some embodiments and situations, the transaction may have one or more associated transaction criteria (e.g., as specified by the user during the interactions with the online client computing device to initiate transaction, as previously stored in OWM transaction information 121, etc.), and if so the OWM system may enforce those criteria as part of the transaction, including to optionally coded transfer information about one or more such criteria in the QR code 186a for use by the offline device 185 and its OWM system component 160B as part of its operations.

In this manner, an embodiment of the OWM system may perform automated operations for managing blockchain transaction approval using an offline device that communicates with an online device using only encoded QR codes and without any inter-device transmissions, as well as according to defined criteria and associated user ownership account information. It will be appreciated that such an OWM system may operate in other environments in other embodiments, including to store and use at least some such information in other manners. In addition, in at least some embodiments, users in an environment such as that of FIG. 1A may interact directly with the one or more computing devices 145 and 185 executing the OWM system, such as via use of the I/O components 110 of device 145 and similar I/O components (not shown) of device 185 and without interacting over the networks 195, while in other embodiments a user may use another device (not shown) to interact over the network(s) 195 with the online computing device 145.

Figure 1B:
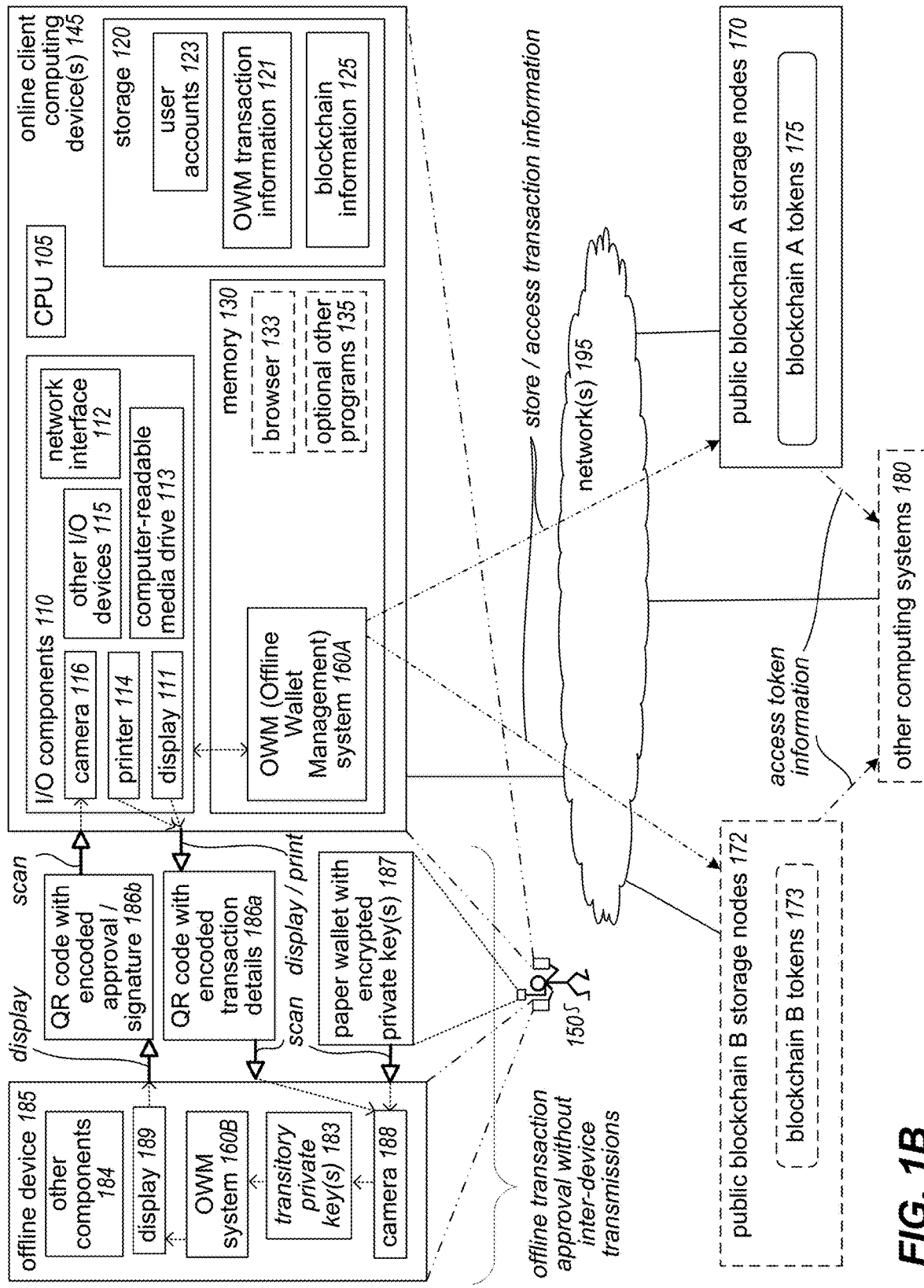
FIG. 1B is a network diagram illustrating an example environment in which an embodiment of an OWM system is provided and used for managing blockchain transaction approval using an offline device that communicates with an online device using only encoded QR codes and without any inter-device transmissions, and for using additional offline storage of private encryption keys, including illustrating example computing systems suitable for executing an embodiment of such a system.

FIG. 1B illustrates an alternative example environment in which an embodiment of an Offline Wallet Management (OWM) system is provided and used for managing blockchain transaction approval using an offline device that communicates with an online device using only encoded QR codes and without any inter-device transmissions, such as in a manner similar to that of FIG. 1A, but with additional offline storage of private encryption keys being used and managed by automated operations of the OWM system. In particular, in the illustrated example embodiment, the user 150 (or other entity, not shown) similarly determines to initiate a blockchain transaction, and interacts with a corresponding online client computing device 145 of the user to provide the transaction details—as part of the user interactions with the online client computing device 145, the OWM system 160A may optionally use an account of the user maintained by the OWM system, in some cases after the user provides a password or other access information. The OWM system 160A on that client computing device 145 then again generates a QR code 186a that includes the transaction details in an encoded format, and the user 150 again uses his or her offline device 185 to scan that QR code, optionally after the user provides a password or other access information to the offline device. However, in the example embodiment of FIG. 1B, at least one private encryption key of the user is not stored on the offline device 185, and is instead stored in one or more paper wallets 187 (e.g., encoded as a QR code with information, optionally encrypted, about the one or more private encryption keys). The user uses the offline device 185 to scan the paper wallet, such as via the camera 188 of the offline device, and stores a transitory copy 183 of the private keys in memory (not shown) of the offline device, before using one or more of those private keys to sign the transaction (once it is approved) before those transitory copies 183 are deleted from the offline device. The OWM system 160B then generates a QR code 186b with encoded information that includes the signed transaction, and the remainder of the transaction in the example embodiment of FIG. 1B precedes in the same manner as previously discussed with respect to FIG. 1A.

In this manner, an embodiment of the OWM system may perform automated operations for managing blockchain transaction approval using an offline device that communicates with an online device using only encoded QR codes and without any inter-device transmissions, with additional offline storage of private encryption keys being used and managed by automated operations of the OWM system. It will be appreciated that such an OWM system may operate in other environments in other embodiments, including to store and use at least some such information in other manners.

Figure 1C:
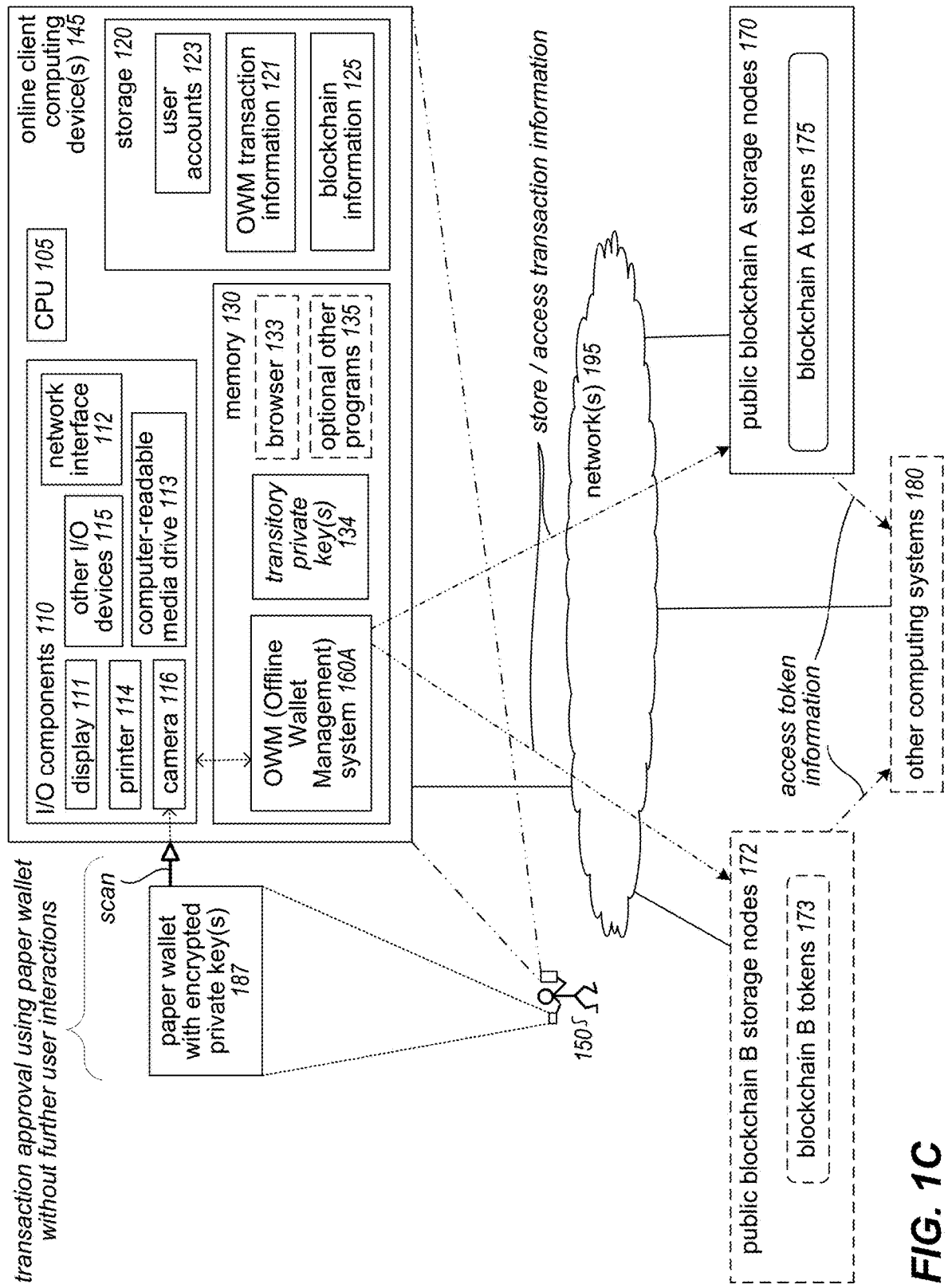
FIG. 1C is a network diagram illustrating an example environment in which an embodiment of an OWM system is provided and used for managing blockchain transaction approval using offline storage of private encryption keys without use of an offline device, including illustrating example computing systems suitable for executing an embodiment of such a system.

FIG. 1C illustrates an alternative example environment in which an embodiment of an Offline Wallet Management (OWM) system is provided and used for managing blockchain transaction approval, such as in a manner similar to that of FIG. 1A, using offline storage of private encryption keys but without using an offline device. In particular, in the illustrated example embodiment, the user 150 (or other entity, not shown) similarly determines to initiate a blockchain transaction, and interacts with a corresponding online client computing device 145 of the user to provide the transaction details—as part of the user interactions with the online client computing device 145, the OWM system 160A may optionally use an account of the user maintained by the OWM system, in some cases after the user provides a password or other access information. The OWM system 160A on that client computing device 145 then retrieves at least one offline stored private encryption key of the user, such as by using camera 116 to scan a QR code that encodes the offline private encryption key(s) in one or more paper wallets 187. The online client device 145 then stores a transitory copy 134 of the private keys in memory 130 of the online device, before using one or more of those private keys to sign the transaction (once it is approved) before those transitory copies 134 are deleted from the online device. The OWM system 160A then proceeds to complete the remainder of the transaction in the example embodiment of FIG. 1C in the same manner as previously discussed with respect to FIGS. 1A and 1B.

In this manner, an embodiment of the OWM system may perform automated operations for managing blockchain transaction approval using offline stored private encryption keys without using an offline device. It will be appreciated that such an OWM system may operate in other environments in other embodiments, including to store and use at least some such information in other manners.

It will be appreciated that the illustrated computing systems and devices in FIGS. 1A-1C are merely illustrative and are not intended to limit the scope of the present invention. More generally, a "client" or "server" computing system or device may comprise any combination of hardware that can interact and perform the described types of functionality, such as when programmed or otherwise configured with software, including without limitation desktop computers, laptop computers, slate computers, tablet computers, embedded computers, specialized hardware such as ASICs ("application-specific integrated circuits") or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 160 and/or its components may include executable software instructions and/or data structures in at least some embodiments, which when loaded on and/or executed by particular computing systems or devices may be used to program or otherwise configure those systems or devices, such as to configure hardware processors of those systems or devices. Alternatively, in other embodiments, some or all of the software components and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system components may in some embodiments be combined in fewer components or distributed in additional components. Similarly, in some embodiments the functionality of some of the illustrated components may not be provided and/or other additional functionality may be available.

Thus, in at least some embodiments, the illustrated components and/or systems are software-based components/systems including software instructions that, when executed by the CPU(s) of systems 145 and/or of other systems executing the OWM system 160 (e.g., a processor, not shown, of the offline device 185) and/or other hardware processor means, program the processor(s) to automatically perform the described operations for that component/system, including to use and execute routines and other algorithms as described herein. Furthermore, in some embodiments, some or all of the components and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 2:
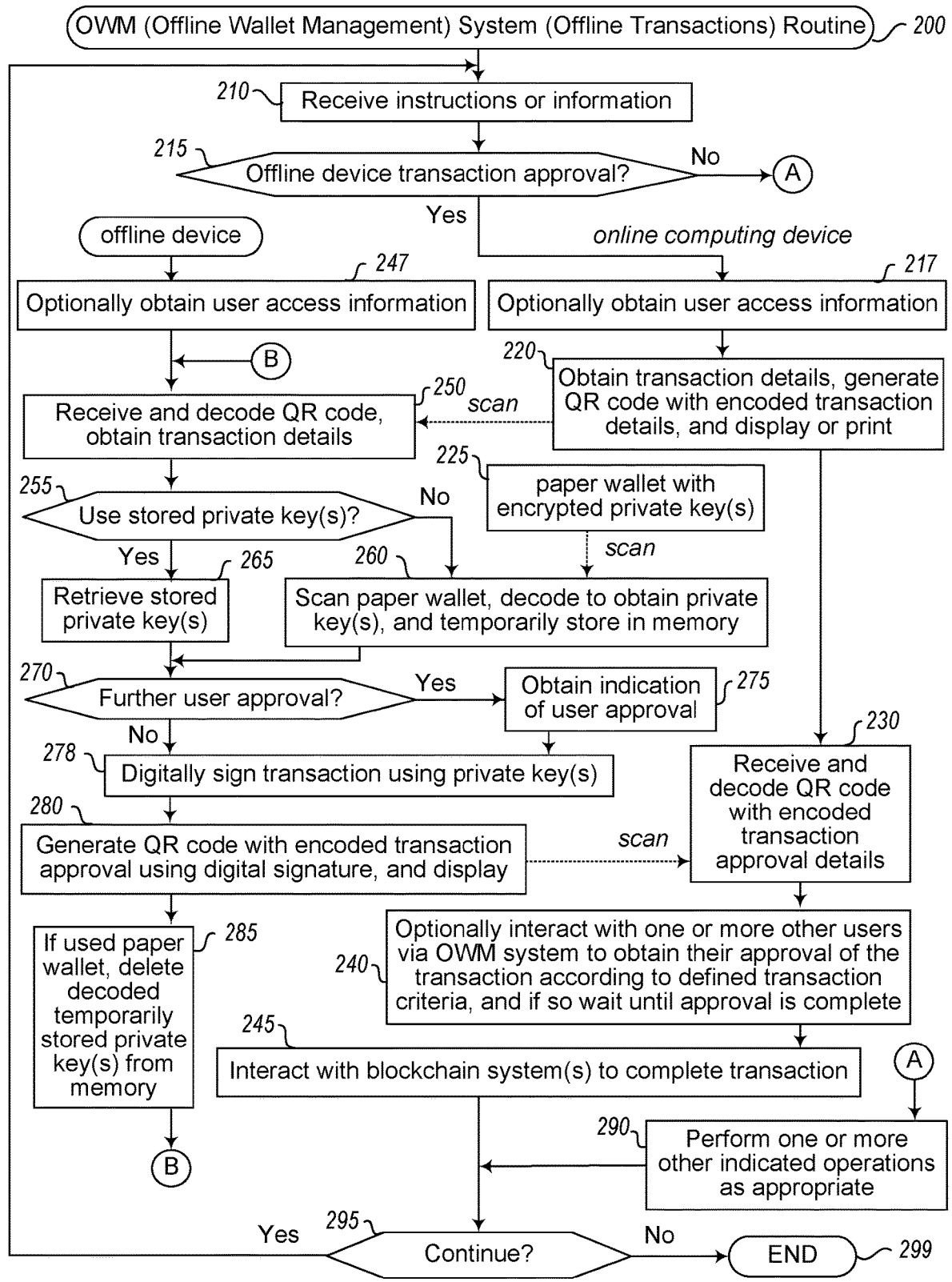
FIG. 2 illustrates a flow diagram of an example embodiment of an Offline Wallet Management (OWM) System routine using an offline device and private encryption keys stored offline.

FIG. 2 illustrates a flow diagram of an example embodiment of an Offline Wallet Management system routine 200 to perform at least some of the described techniques that involve using an offline device to participate in blockchain transaction approval and cryptographic signing. The routine may be performed by, for example, execution of the OWM system 160 (e.g., by OWM system components 160A and 160B) of FIGS. 1A and/or 1B and/or 1C, and/or to provide functionality of the OWM system as is otherwise described herein, including with respect to the examples of FIGS. 5A-5J. While the illustrated embodiment of the routine indicates serial interactions with one or more users and/or other entities, it will be appreciated that some embodiments may support simultaneous access of numerous users and/or other entities to functionality of the system.

In the illustrated embodiment, the routine begins in block 210, where instructions or information are received, such as from a user or associated client computing device or from another entity (e.g., a separate copy of the OWM system that is managing a multi-party transaction, etc.). The routine continues to block 215, where it determines whether the instructions or other information received in block 210 include an indication to approve a transaction using an offline device, and if not continues to block 290. Otherwise, the routine continues to perform blocks 217-285, with blocks 217-245 being performed on an online device of the user (e.g., using a component of the OWM system executing on that online device), and blocks 247-285 being performed on an offline device of the user (e.g., using a component of the OWM system executing on that offline device)—in other embodiments and situations, the operations of the online and offline devices may instead involve interacting with different users.

In particular, in block 217, the online computing device optionally obtains user access information (e.g., a password), and in block 220 obtains details of the transaction, before generating a QR code with the current transaction details, which the online computing device then displays or prints.

On the offline device, in block 247, the routine optionally obtains user access information (e.g., a password), and in block 250 proceeds to receive and decode the QR code generated by the online computing device in block 220, such as by scanning the QR code, and thus receives the details of the transaction. The offline device continues to block 255, where it determines whether to use one or more private encryption keys stored on the offline device, and if so proceeds to block 265 where it retrieves the one or more stored private keys to be used to cryptographically sign the transaction. Otherwise, the routine continues on the offline device to block 260, where it scans one or more paper wallets 225 that together provide the one or more private encryption keys to be used, and temporarily stores those keys in memory of the offline device. After blocks 260 or 265, the routine on the offline device continues to block 270 where it determines whether to obtain further user approval of the transaction, such as based on previously specified settings, and if so continues to block 275 to obtain an indication of the user approval, optionally after displaying transaction details to the user on the offline device. After block 275, or if it was instead determined in block 270 to not obtain further user approval, the routine continues on the offline device to block 278, where it uses the one or more private encryption keys obtained in blocks 260 or 265 to sign the transaction. After block 278, the routine continues to block 280, where it generates a QR code with encoded transaction approval information that includes the digitally signed transaction from block 278, and displays the generated QR code. In block 285, the offline device then deletes decoded temporarily stored private keys from memory that were obtained in block 260, if any, before returning to block 250 to await an indication from the user to proceed, although in other embodiments may perform such deleting before generating the QR code in block 280.

Figure 4:
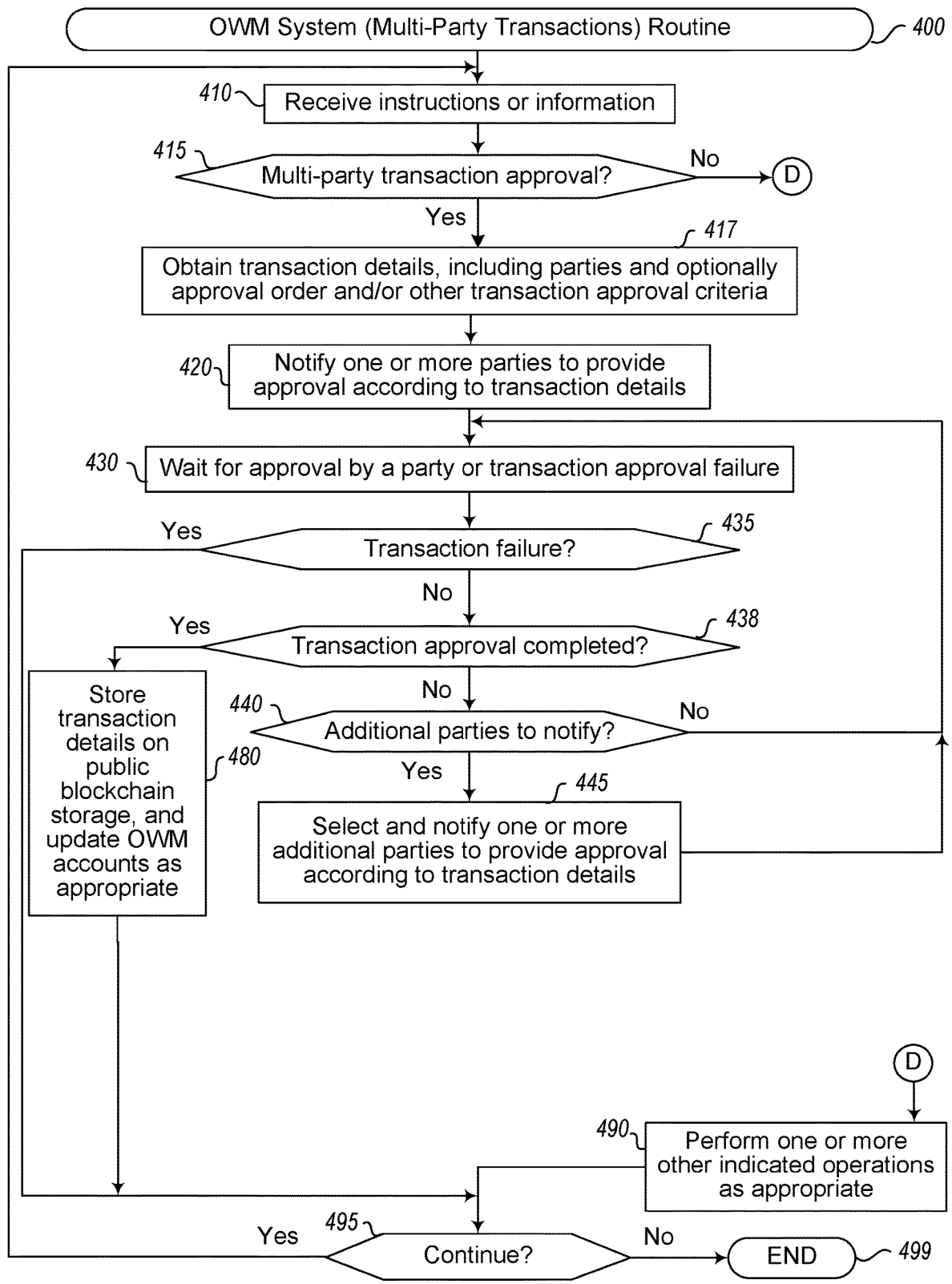
FIG. 4 illustrates a flow diagram of an example embodiment of an Offline Wallet Management (OWM) System routine to perform multi-party transactions using private encryption keys stored offline.

In block 230 on the online computing device, the routine then receives and decodes the QR code generated by the offline device in block 280, including to obtain the signed transaction information. In block 240, the routine on the online device then optionally interacts with one or more other users via the OWM system to obtain their approval of the transaction according to defined transaction criteria, such as if the user has initiated a multi-party transaction, and if so waits in block 240 to receive sufficient approval according to the defined transaction criteria-FIG. 4 provides one example of additional interactions that may be performed by an embodiment of the OWM system that is managing authorizations for multi-party transactions. While not illustrated, the routine may further concurrently perform other activities based on other interactions with the user while waiting in block 240 regarding the current transaction. After block 240, the routine on the online device continues to block 245 to interact with one or more public blockchain storage systems to complete the transaction and store corresponding transaction information, and optionally updates one or more OWM system user accounts to correspond to the transaction completion.

If it is instead determined in block 215 that the instructions or other information received in block 210 are not to perform transaction approval using offline device, the routine continues instead to block 290, where it optionally performs one or more other indicated operations as appropriate. Non-exclusive examples of some such other operations include obtaining and storing information about users, creating ownership accounts for new users (e.g., including to optionally specify an initial balance and/or maximum balance of resource access replenishment credits for that user, such as in response to corresponding information and/or instructions provided by that user), obtaining and storing information about one or more transactions to be managed (e.g., transaction-related criteria, etc.), obtaining and storing information about one or more previous or current transaction approvals (e.g., status information for a pending transaction that is not yet fully approved), receiving and responding to other types of requests for information, etc.

After blocks 245 or 290, the routine continues to block 295 to determine whether to continue, such as until an explicit indication to terminate is received, or instead to continue only if an explicit indication to continue is received. If it is determined to continue, the routine returns to block 210, and otherwise continues to block 299 and ends. In addition, while the illustrated embodiment of the OWM system routine illustrates actions occurring on both the online device and offline device, in other embodiments two separate routines may instead execute on those two devices, interacting only via the scanning of QR codes illustrated in blocks 250 and 230 (or other exchange of information performed without using electronic communications). In addition, while various operations may be illustrated as being performed in a particular manner (e.g., in serial or in parallel, or synchronous or asynchronous) and/or in a particular order, such as to wait in block 240 for approval indications to be received, in other implementations the operations may be performed in other orders and in other manners.

Figure 3:
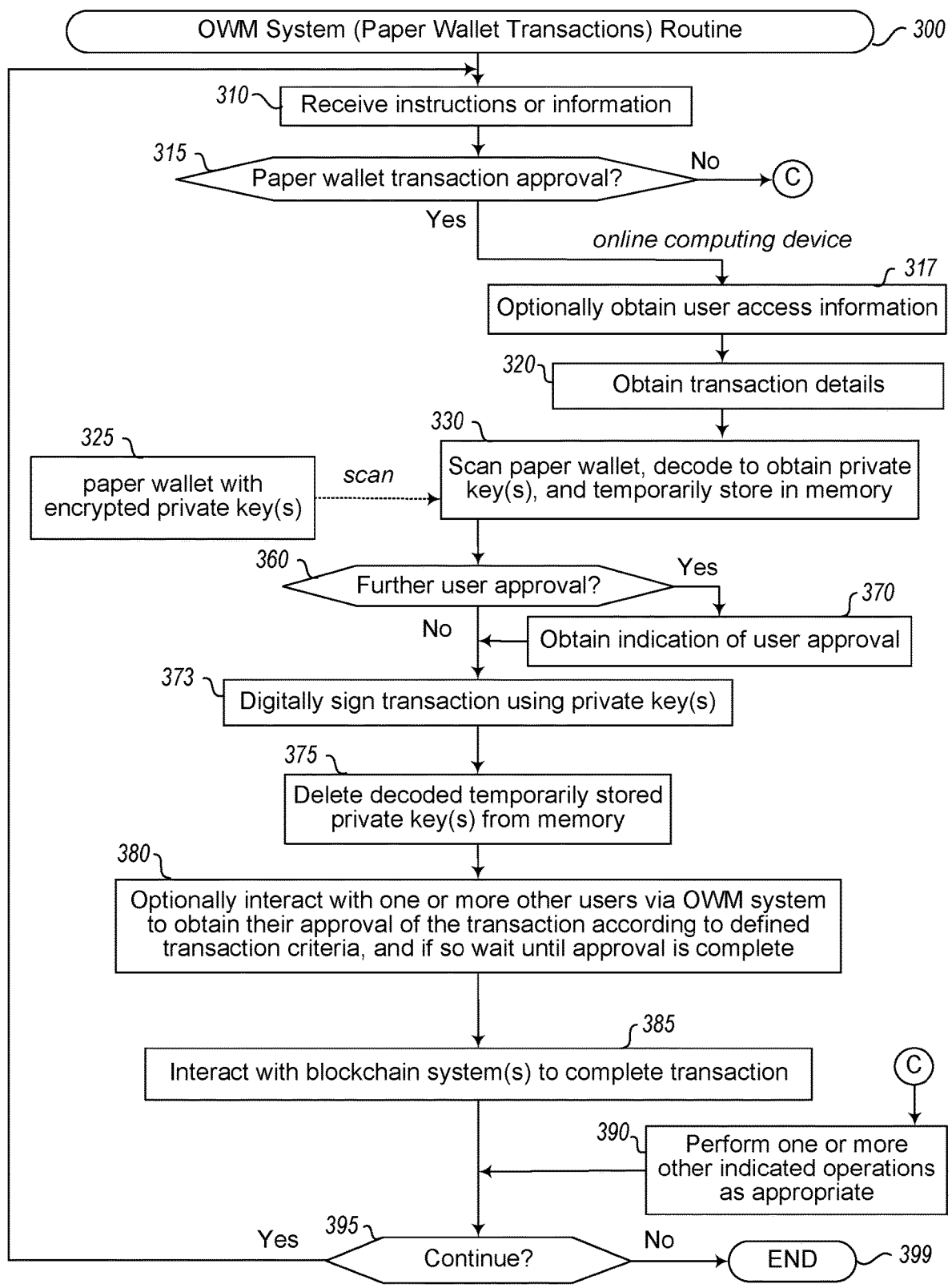
FIG. 3 illustrates a flow diagram of an example embodiment of an Offline Wallet Management (OWM) System routine using private encryption keys stored offline.

FIG. 3 illustrates a flow diagram of an example embodiment of an Offline Wallet Management system routine 300 to perform at least some of the described techniques that involve using stored offline private encryption keys to participate in blockchain transaction approval and cryptographic signing, such as without also using an offline device. The routine may be performed by, for example, execution of the OWM system component 160A of FIGS. 1A and/or 1B and/or 1C, and/or to provide functionality of the OWM system as is otherwise described herein, including with respect to the examples of FIGS. 5A-5J. While the illustrated embodiment of the routine indicates serial interactions with one or more users and/or other entities, it will be appreciated that some embodiments may support simultaneous access of numerous users and/or other entities to functionality of the system.

In the illustrated embodiment, the routine begins in block 310, where instructions or information are received, such as from a user or associated client computing device or from another entity (e.g., a separate copy of the OWM system that is managing a multi-party transaction, etc.). The routine continues to block 315, where it determines whether the instructions or other information received in block 310 include an indication to approve a transaction using one or more offline paper wallets with one or more encoded private encryption keys of the user, and if not continues to block 390. Otherwise, the routine continues to perform blocks 317-385 on the online device of the user (e.g., using a component of the OWM system executing on that online device). In particular, in block 317, the online computing device optionally obtains user access information (e.g., a password), and in block 320 obtains details of the transaction. In block 330, the routine then proceeds to retrieve one or more stored private keys to be used to cryptographically sign the transaction from one or more paper wallets 325, such as to scan a QR code or other encoding for each such paper wallet, and temporarily stores the key(s) in memory of the online device.

After block 330, the routine on the online device continues to block 360 where it determines whether to obtain further user approval of the transaction, such as based on previously specified settings, and if so continues to block 370 to obtain an indication of the user approval, optionally after displaying transaction details to the user on the online device. After block 370, or if it was instead determined in block 360 to not obtain further user approval, the routine continues on the online device to block 373, where it uses the one or more private encryption keys obtained in block 330 to sign the transaction. After block 373, the routine continues to block 375, where it deletes the decoded temporarily stored private keys from memory that were obtained in block 330.

In block 380, the routine on the online device then optionally interacts with one or more other users via the OWM system to obtain their approval of the transaction according to defined transaction criteria, such as if the user has initiated a multi-party transaction, and if so waits in block 380 to receive sufficient approval according to the defined transaction criteria, such as in a manner similar to block 240 of FIG. 2-FIG. 4 provides one example of additional interactions that may be performed by an embodiment of the OWM system that is managing authorizations for multi-party transactions. While not illustrated, the routine may further concurrently perform other activities based on other interactions with the user while waiting in block 380 regarding the current transaction. After block 380, the routine on the online device continues to block 385 to interact with one or more public blockchain storage systems to complete the transaction and store corresponding transaction information, using the signed transaction from block 373 and additional signed transaction information (if any) from block 380, and optionally updates one or more OWM system user accounts to correspond to the transaction completion.

If it is instead determined in block 315 that the instructions or other information received in block 310 are not to perform transaction approval using one or more paper wallets, the routine continues instead to block 390, where it optionally performs one or more other indicated operations as appropriate. Non-exclusive examples of some such other operations include obtaining and storing information about users, creating ownership accounts for new users (e.g., including to optionally specify an initial balance and/or maximum balance of resource access replenishment credits for that user, such as in response to corresponding information and/or instructions provided by that user), obtaining and storing information about one or more transactions to be managed (e.g., transaction-related criteria, etc.), obtaining and storing information about one or more previous or current transaction approvals (e.g., status information for a pending transaction that is not yet fully approved), receiving and responding to other types of requests for information, etc.

After blocks 385 or 390, the routine continues to block 395 to determine whether to continue, such as until an explicit indication to terminate is received, or instead to continue only if an explicit indication to continue is received. If it is determined to continue, the routine returns to block 310, and otherwise continues to block 399 and ends. In addition, while various operations may be illustrated as being performed in a particular manner (e.g., in serial or in parallel, or synchronous or asynchronous) and/or in a particular order, such as to wait in block 380 for approval indications to be received, in other implementations the operations may be performed in other orders and in other manners.

FIG. 4 illustrates a flow diagram of an example embodiment of an Offline Wallet Management system routine 400 to perform at least some of the described techniques that involve managing multi-party blockchain transaction approvals and cryptographic signings in which at least some of the parties use OWM system components to manage the use of stored offline private encryption keys (optionally on offline devices that each execute one of the OWM system components), to participate in transaction approval, such as without also using an offline device. The routine may be performed by, for example, execution of an OWM system 160 of FIGS. 1A and/or 1B and/or 1C (e.g., on one or more server computing systems, not shown) or by one or more components of such an OWM system), and/or to provide functionality of the OWM system as is otherwise described herein, including with respect to the examples of FIGS. 5A-5J. While the illustrated embodiment of the routine indicates serial interactions with one or more users and/or other entities, it will be appreciated that some embodiments may support simultaneous access of numerous users and/or other entities to functionality of the system.

In the illustrated embodiment, the routine begins in block 410, where instructions or information are received, such as from a user or associated client computing device or from another entity (e.g., a separate copy of the OWM system or an OWM system component, etc.)—in some embodiments and situations, the routine may be invoked from block 240 of FIG. 2 and/or block 380 of FIG. 3, such as to obtain additional party approvals after a user that initiated the multi-party approval process has provided his or her approval. The routine continues to block 215, where it determines whether the instructions or other information received in block 410 include an indication to perform a multi-party approval of an indicated transaction, and if not continues to block 490. Otherwise, the routine continues to perform blocks 417-480 on one or more computing systems (e.g., one or more server computing systems). In particular, in block 417, the routine obtains details of the transaction, including some or all of the multiple parties, optionally contact information for the parties if not already known to the OWM system (e.g., via corresponding user accounts of those parties), optionally an order in which to obtain some or all of the party approvals and/or other specified transaction-related criteria for the approval (e.g., a specified quantity or percentage of participants from which approval is needed before the transaction is completed). While not illustrated in FIG. 4, in some embodiments the routine may further first obtains access information (e.g., a password) from a user performing the interactions.

In block 420, the routine then notifies one or more parties to provide approval according to the specified transaction details, such as one or more parties whose approval is needed before that of other parties, or all parties have no such order is needed—in at least some such embodiments, the notification may be performed to a component of the OWM system executing on an online device of that party, such as for that OWM system component to manage the further interactions with that party to obtain that party's approval. After block 420, the routine continues to block 430 to wait for approval by a party or to receive an indication of failure of the transaction (e.g., due to a timeout in which the transaction approval is not performed within a specified time period or by a specified deadline; by an indication of a rejection of the transaction approval by a party that is required according to the defined transaction criteria; by an indication of a rejection of the transaction approval by a sufficient quantity of parties to prevent the defined transaction criteria to be satisfied; etc.). In block 435, the routine then determines whether the indication in block 430 was of failure to obtain the transaction approval, and if not continues to block 438 where the routine determines whether the indication in block 430 was of a completion of the transaction of approval according to the defined transaction criteria, and if so continues to block 480. In block 480, the routine stores the transaction details on public blockchain storage, and optionally updates one or more OWM system user accounts to correspond to the transaction completion, in a manner analogous to that of blocks 245 and 385 of FIGS. 2 and 3, respectively.

If it is instead determined in block 438 that the indication in block 430 was not of a completion of the transaction of approval according to the defined transaction criteria (e.g., was an indication of an approval by one party, but not yet sufficient parties to complete the transaction), the routine continues to block 440, where it determines whether there are additional parties to notify, and if so continues to block 445 to select and notify one or more additional parties to provide approval according to the transaction criteria. After block 445, or if it was instead determined in block 440 that there are not additional parties to notify, the routine returns to block 430 to await a next approval or other indication of a failure of the transaction approval process.

If it is instead determined in block 415 that the instructions or other information received in block 410 are not to perform multi-party transaction approval, the routine continues instead to block 490, where it optionally performs one or more other indicated operations as appropriate. Non-exclusive examples of some such other operations include obtaining and storing information about users, creating ownership accounts for new users (e.g., including to optionally specify an initial balance and/or maximum balance of resource access replenishment credits for that user, such as in response to corresponding information and/or instructions provided by that user), obtaining and storing information about one or more transactions to be managed (e.g., transaction-related criteria, etc.), obtaining and storing information about one or more previous or current transaction approvals (e.g., status information for a pending transaction that is not yet fully approved), receiving and responding to other types of requests for information, etc.

After blocks 480 or 490, or if it was instead determined in block 435 that an indication of a transaction approval failure have been received in block 430, the routine continues to block 495 to determine whether to continue, such as until an explicit indication to terminate is received, or instead to continue only if an explicit indication to continue is received. If it is determined to continue, the routine returns to block 410, and otherwise continues to block 499 and ends. In addition, while various operations may be illustrated as being performed in a particular manner (e.g., in serial or in parallel, or synchronous or asynchronous) and/or in a particular order, such as to wait in block 430 for approval indications to be received, in other implementations the operations may be performed in other orders and in other manners.

Figure 5A:
FIGS. 5A-5J illustrate examples of managing blockchain transaction approval using an offline device that communicates with an online device using only encoded QR codes and without any inter-device transmissions.
Figure 5A:
Figure 5A:
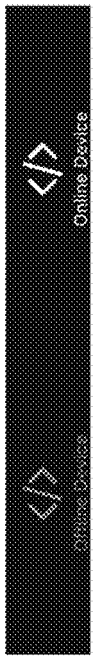

FIGS. 5A-5I illustrate examples of managing blockchain transaction approval using an offline device that communicates with an online device using only encoded QR codes and without any inter-device transmissions according to one non-exclusive example embodiment. In particular, FIG. 5A illustrates an example of the screen of an online device (in this example, a smart phone screen) in which a user in specifying details of a transaction to be approved and completed, including in this specific example to send a specified amount of cryptographic coins (in this example, 0.1 Ethereum) from the user (from a cryptographic wallet of the user maintained by the OWM system) to a specified network address of a recipient (e.g., a destination cryptographic wallet, such as maintained by the OWM system or other third-party system), and with the corresponding QR code being generated that encodes details of the transaction.

Figure 5B:
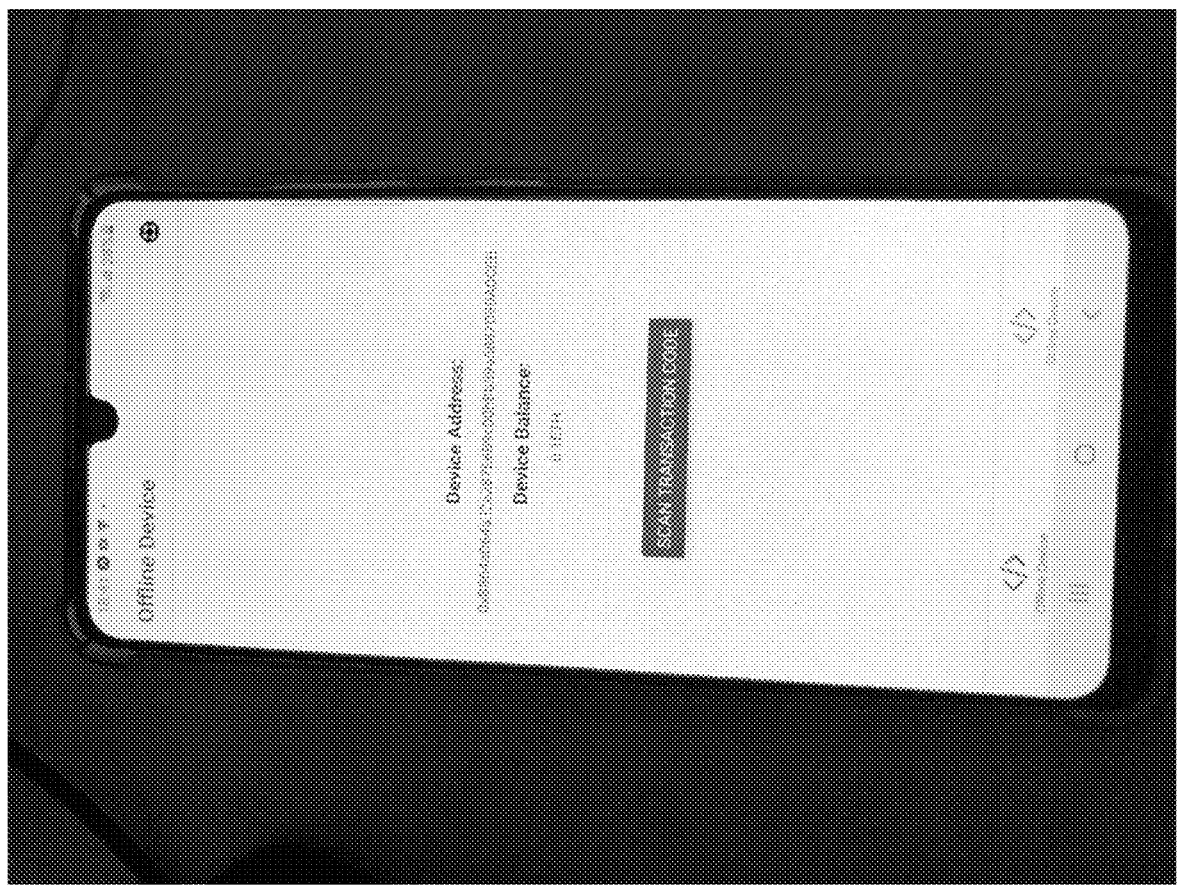
Figure 5C:
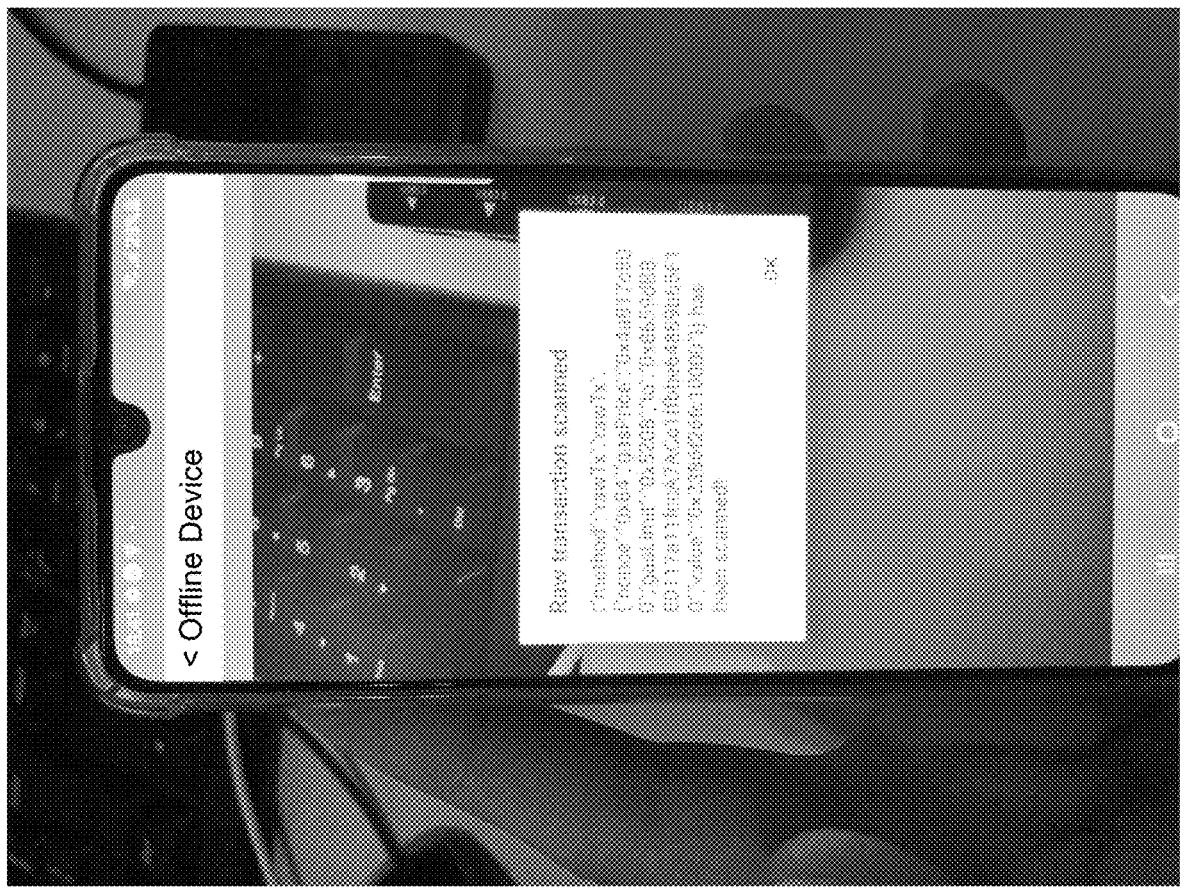
Figure 5D:
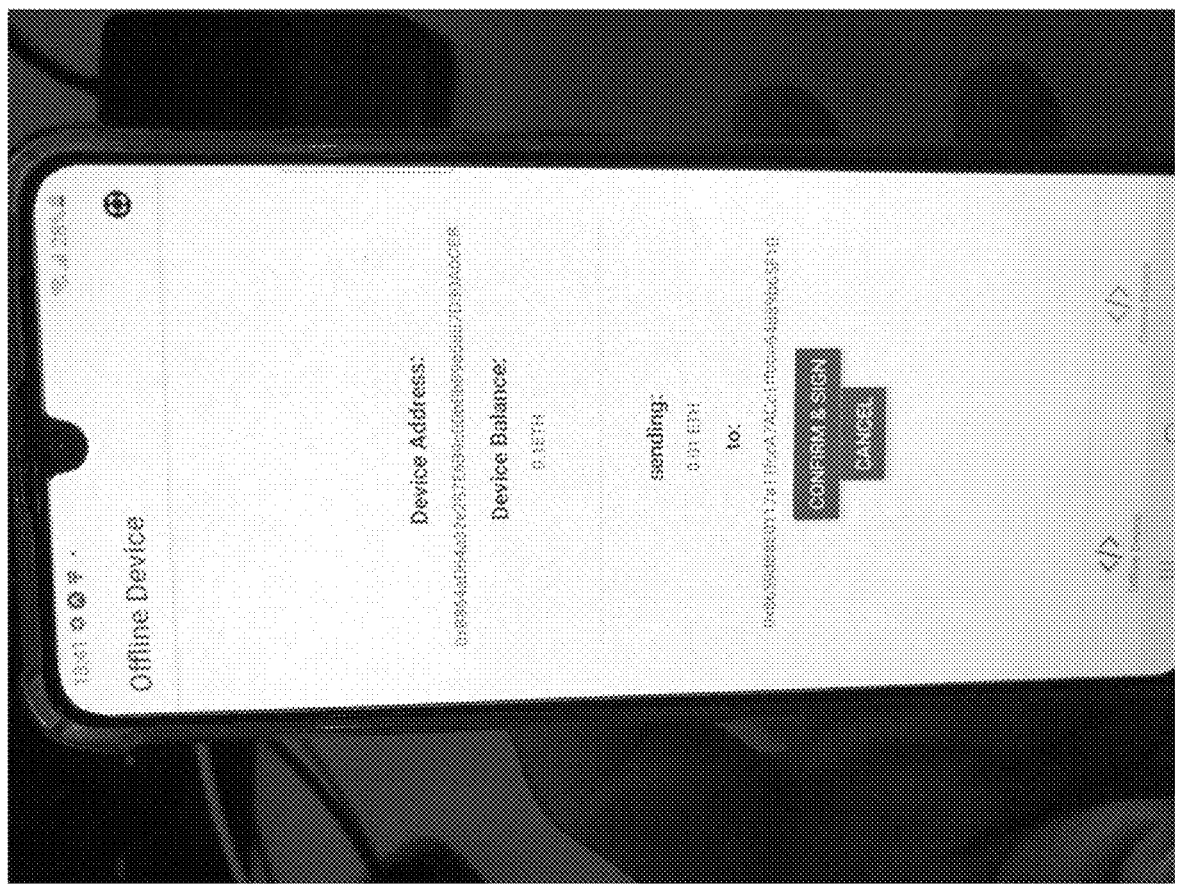
Figure 5E:
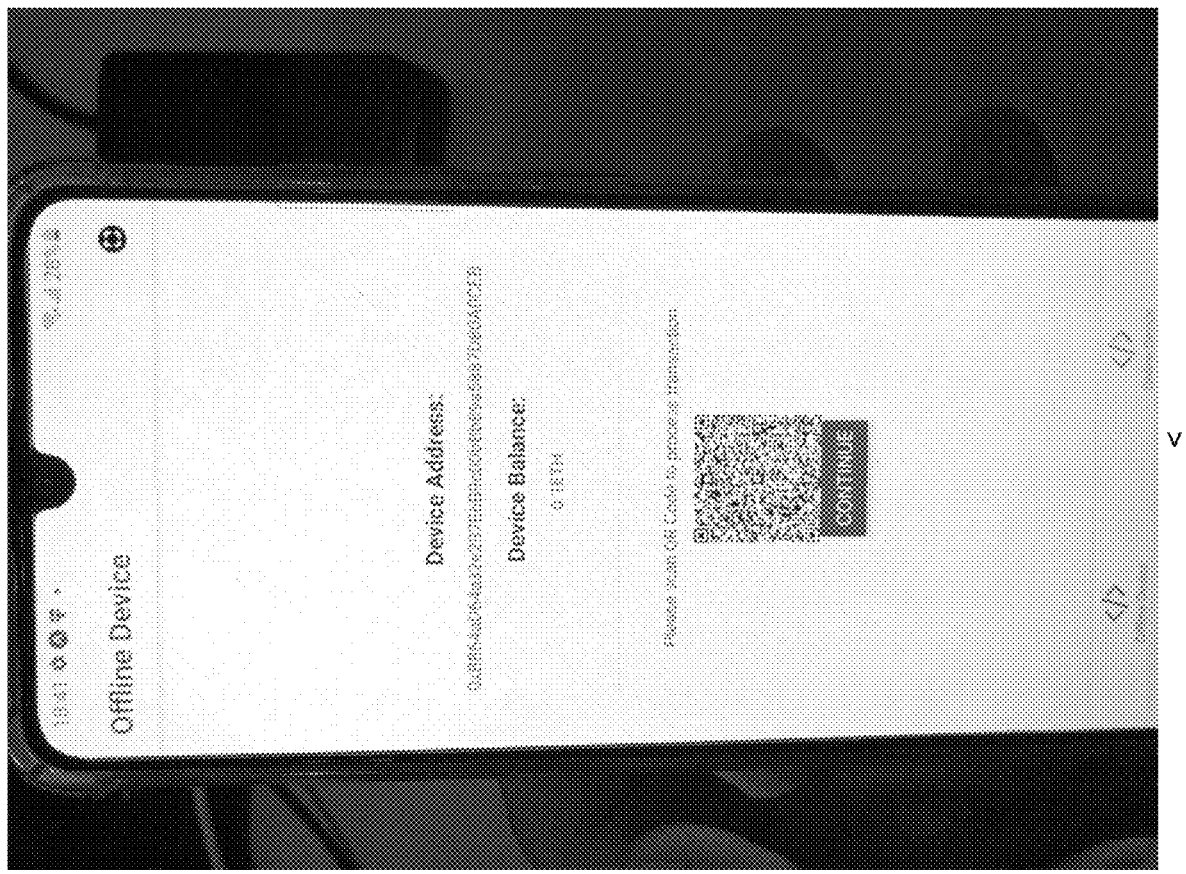

FIG. 5B continues the example of FIG. 5A, and illustrates an example of the screen of an offline device (in this example, a screen of a different smart phone) in which the user has scanned the QR code illustrated in FIG. 5A, with corresponding details of the transaction being shown, such as after the user has selected a user-selectable GUI (graphical user interface) control on the offline device to "Scan Transaction Code" and performed the corresponding scanning. FIG. 5C further illustrates an example of the screen of the offline device after the scan of the QR code occurs, such as to confirm successful scanning of the QR code. FIG. 5D continues the examples of FIGS. 5A-5C, and illustrates a next screen of the offline device in which the user is asked to select a user-selectable control of the GUI to either confirm the transaction and cryptographically sign it, or to cancel the transaction. FIG. 5E continues the examples of FIGS. 5A-5D, and illustrates a next screen of the offline device after the user has confirmed to complete the transaction, with the offline device having generated and displayed a QR code that encodes the cryptographically sign transaction.

Figure 5F:
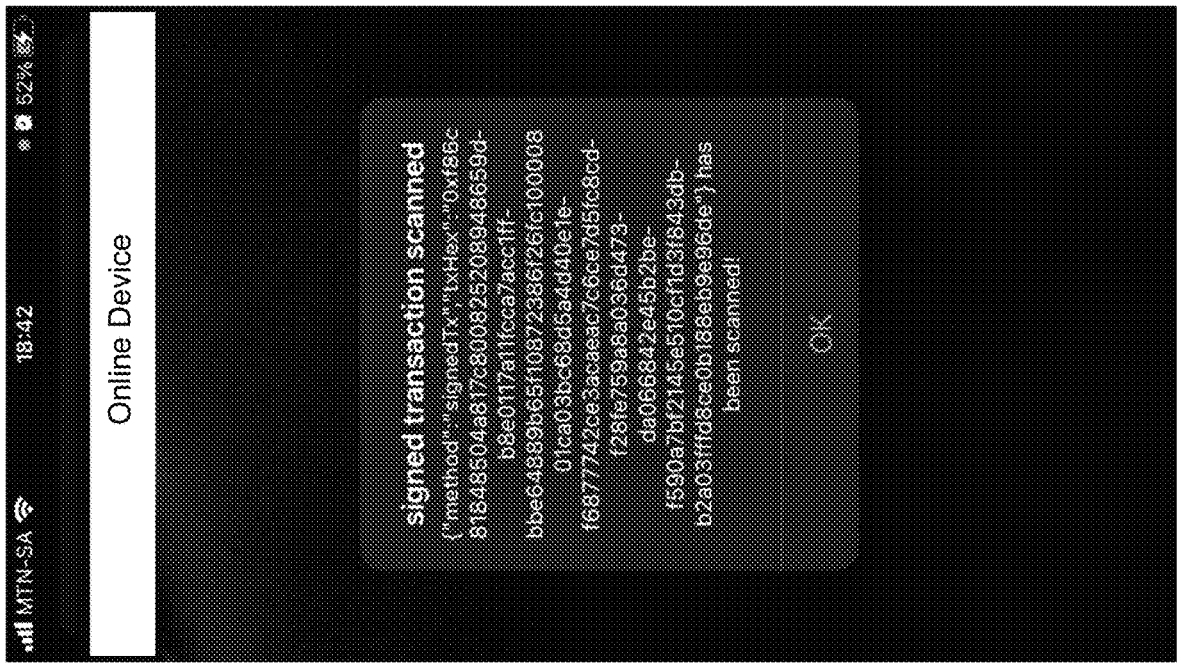
Figure 5G:
Figure 5G:
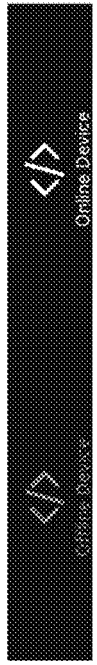
Figure 5H:
Figure 5H:
Figure 5H:
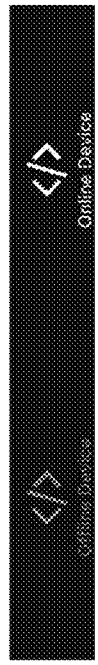
Figure 5I:

FIG. 5F continues the examples of FIGS. 5A-5E, and illustrates the screen of the online device after it is used to scan the QR code generated by the offline device, such as to confirm successful scanning of the QR code. FIG. 5G continues the examples of FIGS. 5A-5F, and illustrates a next screen of the online device, in which the user is asked to confirm the transaction, such as by selecting a corresponding user-selectable control of the GUI on the online device. FIG. 5H continues the examples of FIGS. 5A-5G, and illustrates a next screen of the online device after the user has confirmed to proceed with the transaction, in which the online device is interacting with one or more public blockchain storage nodes to store information about the transaction on the blockchain. FIG. 5I continues the examples of FIGS. 5A-5H, and illustrates the next screen of the online device as it confirms that the transaction has been completed.

In this manner, an embodiment of the OWM system may perform automated operations for managing blockchain transaction approval using an offline device that communicates with an online device using only encoded QR codes and without any inter-device communications, as well as according to defined criteria and associated user ownership account information. It will be appreciated that such an OWM system may operate in other environments in other embodiments, including to store and use at least some such information in other manners.

Figure 5J:
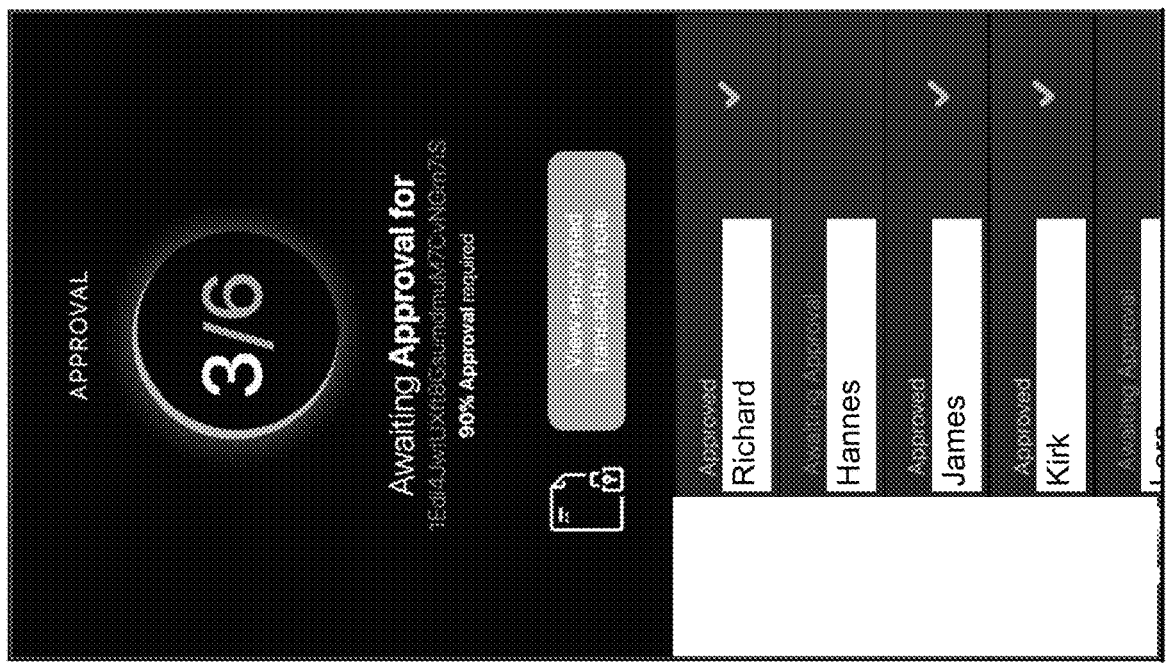

FIG. 5J illustrates an example of managing blockchain transaction approval for a multi-party transaction by the OWM system, optionally in which one or more of the parties each uses the OWM system and an offline device to perform that party's transaction approval, according to one non-exclusive example embodiment. In particular, FIG. 5J illustrates an example of the screen of a computing device or system (in this example, a smart phone screen) in which a multi-party transaction has been initiated, with transaction-related criteria including that 90% approval is needed from a specified list of six parties (, all parties in this example, until at least 10 parties are reached, after which only a 90% subset of those parties would be needed). In this example, three of the six that it parties have provided approval, as reflected in the information shown in the bottom part of the screen, but approval waiting from three other parties (with one of those parties not visible until the screen is scrolled down). FIG. 4 provides one example of an embodiment of a routine for managing such multi-party approval by the OWM system, and it will be appreciated that information about a pending approval process for a multi-party transaction may be displayed or otherwise provided to one or more users or other parties in various other manners in other embodiments.

Various details are provided with respect to the examples of FIGS. 1A-1C and FIGS. 5A-5J, but it will be appreciated that the provided details are non-exclusive examples included for illustrative purposes, and other embodiments may be performed in other manners without some or all such details.

Non-exclusive example embodiments described herein are further described in the following clauses.

A01. A computer-implemented method comprising:
obtaining, by a first online computing device of a user that has an active network connection to other computing systems, information from the user regarding a blockchain transaction to complete;
generating, by the first online computing device, at least one transaction data QR (quick response) code that encodes data about the blockchain transaction, including displaying the at least one transaction data QR code on a display screen of the first online computing device;
obtaining, by a second offline second computing device of the user that is not connected to any other computing devices via any wired or wireless connections, the data about the blockchain transaction by scanning, under control of the user, the at least one transaction data QR code displayed on the display screen of the first online computing device;
retrieving, by the second offline computing device, one or more offline private encryption keys of the user that are stored on the second offline computing device and are not accessible to any other computing devices, and using at least one of the retrieved one or more offline private encryption keys to cryptographically sign the blockchain transaction;
generating, by the second offline computing device, at least one transaction approval QR code encoding data that includes the cryptographically signed blockchain transaction, including displaying the at least one transaction approval QR code on a display screen of the second offline computing device;
obtaining, by the first online computing device, the data including the cryptographically signed blockchain transaction by scanning, under control of the user, the at least one transaction approval QR code displayed on the display screen of the second offline computing device; and
transmitting, by the first online computing device and using the active network connection, information about the blockchain transaction to one or more blockchain storage nodes of a public blockchain storage system, to complete the blockchain transaction and cause the blockchain transaction to be confirmed by the public blockchain storage system based on actions of the first online computing device without having access to the at least one retrieved private encryption key used to cryptographically sign the blockchain transaction.

A02. The computer-implemented method of clause A01 wherein the generating of the at least one transaction data QR code is performed by automated operations of a first component of an Offline Wallet Management (OWM) system executing on the first online computing device, wherein the generating of the at least one transaction approval QR code is performed by automated operations of a second component of the OWM system executing on the second offline computing device, and wherein the method further comprises:
obtaining, by the second offline computing device as part of the automated operations of the second component of the OWM system, and after the obtaining of the data about the blockchain transaction and before the generating of the at least one transaction approval QR code, information from the user via one or more first interactions with the second offline computing device to approve the blockchain transaction; and
obtaining, by the first online computing device as part of the automated operations of the first component of the OWM system, and after the obtaining of the data including the cryptographically signed blockchain transaction and before the transmitting of the information about the blockchain transaction, information from the user via one or more second interactions with the first online computing device to confirm the blockchain transaction.

A03. The computer-implemented method of any one of clauses A01-A02 further comprising:

obtaining, by the second offline computing device and before the retrieving of the one or more private encryption keys, the one or more private encryption keys of the user by scanning, under control of the user, at least one private key QR code of a paper cryptographic wallet that is not accessible to any other computing devices;

storing, by the second offline computing device, a temporary copy of the one or more private encryption keys on the second offline computing device; and deleting, by the second offline computing device, and after cryptographic signing of the blockchain transaction by the offline device and before the generating of the at least one transaction approval QR code, the stored temporary copy of the one or more private encryption keys from the second offline computing device, and wherein the retrieved one or more private encryption keys of the user are from the temporary copy stored on the second offline computing device.

A04. The computer-implemented method of any one of clauses A01-A03 wherein the obtaining of the information from the user regarding the blockchain transaction includes receiving information indicating that the blockchain transaction is a multi-party transaction involving one or more other users and indicating one or more transaction criteria to be satisfied in order to complete the blockchain transaction, wherein the method further comprises:

interacting, by the first online computing device and using the active network connection, with one or more other online devices of the one or more other users in order to obtain approval of the blockchain transaction by at least one of the one or more other users that satisfies the one or more transaction criteria; and determining, by the first online computing device, to perform the transmitting of the information about the blockchain transaction based at least in part on receiving responses over the active network connection from at least one of the one or more other online devices that indicates that the at least one other user has provided approval of the blockchain transaction that satisfies the one or more transaction criteria.

A05. A computer-implemented method comprising:

obtaining, by a first computing device having a network connection to other computing systems, information regarding a blockchain transaction to complete;

generating, by the first computing device, at least one transaction data QR (quick response) code that encodes data about the blockchain transaction;

obtaining, by a second computing device that is not connected to any other computing devices via any wired or wireless connections, the data about the blockchain transaction by scanning the at least one transaction data QR code;

retrieving, by the second computing device, one or more private encryption keys that are not accessible to the first computing device, and using at least one of the retrieved one or more private encryption keys to cryptographically sign the blockchain transaction;

generating, by the second computing device, at least one transaction approval QR code that encodes data about the cryptographically signed blockchain transaction;

obtaining, by the first computing device, the data about the cryptographically signed blockchain transaction by scanning the at least one transaction approval QR code; and transmitting, by the first computing device and using the network connection, information about the blockchain transaction to one or more blockchain storage nodes of a blockchain storage system, to cause the blockchain storage system to confirm the blockchain transaction.

A06. The computer-implemented method of any one of clauses A01-A05 wherein the one or more private encryption keys are controlled by a user, wherein the second computing device is an offline computing device that is in use by the user and that stores the one or more private encryption keys and that performs the scanning of the at least one transaction data QR code under control of the user and that displays the generated at least one transaction approval QR code on a display screen of the second computing device, and wherein the first computing device is an online computing device that is also in use by the user and that receives the obtained information regarding the blockchain transaction from the user via one or more interactions of the user with the first computing device and that displays the generated at least one transaction data QR code on a display screen of the first computing device and that performs the scanning of the at least one transaction approval QR code under control of the user.

A07. The computer-implemented method of any one of clauses A01-A06 wherein the generating of the at least one transaction data QR code is performed by automated operations of a first component of an Offline Wallet Management (OWM) system executing on the first computing device, wherein the generating of the at least one transaction approval QR code is performed by automated operations of a second component of the OWM system executing on the second computing device, and wherein the method further comprises:

obtaining, by the second computing device as part of the automated operations of the second component of the OWM system, and after the obtaining of the data about the blockchain transaction and before the generating of the at least one transaction approval QR code, information from a user via one or more first interactions with the second computing device to approve the blockchain transaction; and obtaining, by the first computing device as part of the automated operations of the first component of the OWM system, and after the obtaining of the data about the cryptographically signed blockchain transaction and before the transmitting of the information about the blockchain transaction, information from the user via one or more second interactions with the first computing device to confirm the blockchain transaction.

A08. The computer-implemented method of any one of clauses A01-A07 wherein the retrieving of the one or more private encryption keys includes scanning, by the second computing device and under control of a user that controls the one or more private encryption keys, at least one private key QR code of a paper cryptographic wallet that is not accessible to any other computing devices, and further includes storing, by the second computing device, a temporary copy of the one or more private encryption keys on the second computing device, and wherein the method further comprises deleting, by the second computing device, and after cryptographic signing of the blockchain transaction by the second computing device and before the scanning of the at least one transaction approval QR code by the first computing device, the stored temporary copy of the one or more private encryption keys from the second computing device.

A09. The computer-implemented method of any one of clauses A01-A08 wherein the first and second computing devices are in use by a first user, wherein the obtaining of the information regarding the blockchain transaction includes receiving information indicating that the blockchain transaction is a multi-party transaction involving one or more second users and indicating one or more transaction criteria to be satisfied in order to complete the blockchain transaction, and wherein the method further comprises:

interacting, by the first computing device and using the network connection, with one or more online devices of the one or more second users in order to obtain approval of the blockchain transaction by at least one of the one or more second users that satisfies the one or more transaction criteria; and determining, by the first computing device, to perform the transmitting of the information about the blockchain transaction based at least in part on receiving responses over the network connection from at least one of the one or more online devices that indicate that the at least one second user has provided approval of the blockchain transaction that satisfies the one or more transaction criteria.

A10. A computer-implemented method comprising:

obtaining, by an online computing device having a network connection to other computing systems, information regarding a blockchain transaction to complete;

generating, by the online computing device, at least one transaction data code that encodes data about the blockchain transaction;

providing, by the online computing device, the at least one transaction data code for scanning by an offline device that is not connected to any other computing devices via any wired or wireless connections, to cause the offline device to obtain the data about the blockchain transaction and to generate and provide at least one transaction approval code that encodes data about a cryptographically signed blockchain transaction using at least one private encryption key that is not accessible to the online computing device;

obtaining, by the online computing device, the data about the cryptographically signed blockchain transaction by scanning the at least one transaction approval code provided by the offline device; and transmitting, by the online computing device using the network connection, and in response to the obtaining of the data about the cryptographically signed blockchain transaction, information about the blockchain transaction to a blockchain storage system, to cause the blockchain transaction to be confirmed by the blockchain storage system.

A11. The computer-implemented method of any one of clauses A01-A10 wherein the provided at least one transaction data code is a first QR (quick response) code displayed on a display screen of the online computing device, and wherein the provided at least one transaction approval code is a second QR code displayed on a display screen of the offline computing device.

A12. The computer-implemented method of any one of clauses A01-A11 further comprising:

obtaining, by the offline device, the data about the blockchain transaction by scanning the at least one transaction data code provided by the online computing device;

retrieving, by the offline device, one or more private encryption keys that include the at least one private encryption key, and using the at least one private encryption key to cryptographically sign the blockchain transaction;

generating, by the offline device, the at least one transaction approval code that encodes the data about the cryptographically signed blockchain transaction; and providing, by the offline device, the generated at least one transaction approval code for the scanning by the online computing device.

A13. The computer-implemented method of any one of clauses A01-A12 wherein the method further comprises obtaining, by the online computing device and after the obtaining of the data about the cryptographically signed blockchain transaction and before the transmitting of the information about the blockchain transaction, confirmation information for the blockchain transaction from a user via one or more interactions with the online computing device, and wherein the transmitting of the information about the blockchain transaction is performed in response to the obtaining of the confirmation information.

A14. The computer-implemented method of any one of clauses A01-A13 further comprising:

obtaining, by the offline device, the at least one private encryption key by scanning, under control of a user associated with the at least one private encryption key, at least one private key code of a paper cryptographic wallet that is not accessible to any other computing devices;

storing, by the offline device, a temporary copy of the at least one private encryption key on the offline device; and deleting, by the offline device, and after cryptographic signing of the blockchain transaction by the offline device and before generating of the at least one transaction approval code, the stored temporary copy of the at least one private encryption key from the offline device.

A15. The computer-implemented method of any one of clauses A01-A14 wherein the online computing device is used by a first user, wherein the obtaining of the information regarding the blockchain transaction includes receiving information indicating that the blockchain transaction is a multi-party transaction involving one or more second users separate from the first user and indicating one or more transaction criteria to be satisfied in order to complete the blockchain transaction, and wherein the method further comprises:

interacting, by the online computing device and using the network connection, with one or more other online devices of the one or more second users in order to obtain approval of the blockchain transaction by at least one of the one or more second users that satisfies the one or more transaction criteria; and determining, by the online computing device, to perform the transmitting of the information about the blockchain transaction based at least in part on receiving responses over the network connection from at least one of the one or more other online devices that indicates that the at least one second user has provided approval of the blockchain transaction that satisfies the one or more transaction criteria.

A16. The computer-implemented method of any one of clauses A01-A15 wherein the at least one private encryption key is associated with a user, and wherein the method further comprises:

obtaining, by the online computing device, information
   related to the user obtaining access to restricted functionality available via the online computing device;
generating, by the online computing device, at least one
   access data code that encodes data about the access to
   the restricted functionality;
providing, by the online computing device, the at least
   one access data code for scanning by the offline device,
   to cause the offline device to obtain the data about the
   access to the restricted functionality and to generate
   and provide at least one access approval code that
   encodes data about cryptographically signed information about the access to the restricted functionality
   using the at least one private encryption key;
obtaining, by the online computing device, the data about
   the cryptographically signed information by scanning
   the at least one access approval code provided by the
   offline device; and
providing, by the online computing device and in
   response to the obtaining of the data about the cryptographically signed information, the access to the
   restricted functionality to the user.

A17. A computer-implemented method comprising:
obtaining, by an online computing device having a network connection to other computing systems, information regarding a blockchain transaction to complete;
obtaining, by the online computing device, at least one
   private encryption key by scanning, under control of a
   user associated with the at least one private encryption
   key, at least one private key code of a paper cryptographic wallet;
storing, by the online computing device, a temporary copy
   of the at least one private encryption key on the online
   computing device;
using, by the online computing device, the stored temporary copy of the at least one private encryption key to
   cryptographically sign the blockchain transaction;
deleting, by the online computing device, the stored
   temporary copy of the at least one private encryption
   key from the online computing device; and
transmitting, by the online computing device and using
   the network connection, information about the blockchain transaction to a blockchain storage system, to
   cause the blockchain transaction to be confirmed by the
   blockchain storage system.

A18. A computer-implemented method comprising:
obtaining, by an offline computing device not connected
   to any other computing devices via any wired or
   wireless connections, information regarding access of a
   user of the offline computing device to restricted functionality available via an other computing device;
retrieving, by the offline computing device, one or more
   private encryption keys that are not accessible to the
   other computing device;
using, by the offline computing device, at least one of the
   retrieved one or more private encryption keys to cryptographically sign information related to the access;
generating, by the offline computing device, at least one
   access approval code that encodes data about the cryptographically signed information; and
providing, by the offline computing device, the at least
   one access approval code for scanning by the other
   computing device, to cause the other computing device
   to obtain the data about the cryptographically signed
   information and to use the obtained data to initiate the
   access of the user to the restricted functionality.

A19. The computer-implemented method of any one of
clauses A01-A18 further comprising:
   obtaining, by the other computing device, a request from
      the user for the access to the restricted functionality;
   generating, by the other computing device, at least one
      access data code that encodes the information regarding
      the access of the user of the offline computing device to
      the restricted functionality;
   providing, by the other computing device, the generated at
      least one access data code, and wherein the obtaining
      by the offline computing device of the information
      includes scanning, by the offline computing device and
      under control of the user, the generated at least one
      access data code;
   obtaining, by the other computing device, the data about
      the cryptographically signed information by scanning
      the provided at least one access approval code; and
   providing, by the other computing device and in response
      to the obtaining of the data about the cryptographically
      signed information, the access of the user to the
      restricted functionality.

A20. A computer-implemented method comprising:
obtaining, by an offline computing device not connected
   to any other computing devices via any wired or
   wireless connections, data about a blockchain transaction to be completed by scanning at least one provided
   transaction data code that encodes data about the blockchain transaction;
retrieving, by the offline computing device, one or more
   private encryption keys that are not accessible to any
   computing devices having a network connection to
   other computing devices, and using at least one of the
   retrieved one or more private encryption keys to cryptographically sign the blockchain transaction;
generating, by the offline computing device, at least one
   transaction approval code that encodes data about the
   cryptographically signed blockchain transaction; and
providing, by the offline computing device, the at least
   one transaction approval code for scanning by an online
   computing device having a network connection to other
   computing systems, to cause the online computing
   device to obtain the data about the cryptographically
   signed blockchain transaction and to transmit information about the blockchain transaction to a blockchain
   storage system.

A21. The computer-implemented method of any one of
clauses A01-A20 wherein the at least one provided transaction data code is a first QR (quick response) code displayed
on a display screen of the online computing device, and
wherein the provided at least one transaction approval code
is a second QR code displayed on a display screen of the
offline computing device.

A22. The computer-implemented method of any one of
clauses A01-A21 further comprising:
   obtaining, by an online computing device, information
      regarding the blockchain transaction;
   generating, by the online computing device, the at least
      one transaction data code in response to the obtaining
      of the information;
   providing, by the online computing device, the generated
      at least one transaction data code for the scanning by
      the offline computing device;
   obtaining, by the online computing device, the data about
      the cryptographically signed blockchain transaction by
      scanning the provided at least one transaction approval
      code; and transmitting, by the online computing device and using the network connection, information about the blockchain transaction to one or more blockchain storage nodes of a blockchain storage system, to cause the blockchain transaction to be confirmed by the blockchain storage system.

A23. The computer-implemented method of any one of clauses A01-A22 further comprising obtaining, by the offline computing device and before the generating of the at least one transaction approval code, approval information for the blockchain transaction from a user via one or more interactions with the offline computing device, and wherein the generating of the at least one transaction approval code is performed in response to the obtaining of the approval information.

A24. The computer-implemented method of any one of clauses A01-A23 wherein the retrieving of the one or more private encryption keys includes scanning, by the offline computing device and under control of a user associated with the one or more private encryption keys, at least one private key code of at least one paper cryptographic wallet that is not accessible to any other computing devices, and includes storing, by the offline computing device, a temporary copy of the one or more private encryption keys on the offline computing device, and wherein the method further comprises deleting, by the offline computing device, and after cryptographic signing of the blockchain transaction by the offline computing device and before scanning of the at least one transaction approval code by the online computing device, the stored temporary copy of the one or more private encryption keys from the offline computing device.

A25. The computer-implemented method of clause A24 wherein the at least one private encryption key is a single private encryption key that is distributed across multiple private keys codes that are multiple distinct QR (quick response) codes, and wherein the scanning of the at least one private key code includes scanning the multiple QR codes and combining data encoded in the multiple QR codes to recover the single private encryption key.

A26. The computer-implemented method of any one of clauses A01-A25 wherein the offline computing device is used by a first user, wherein the blockchain transaction is a multi-party transaction involving one or more second users separate from the first user and indicating one or more transaction criteria to be satisfied in order to complete the blockchain transaction, wherein the online computing device is another of the one or more computing devices, and wherein the method further comprises:
  interacting, by the online computing device and using the network connection, with one or more other online devices of the one or more second users in order to obtain approval of the blockchain transaction by at least one of the one or more second users that satisfies the one or more transaction criteria;
  determining, by the online computing device, to perform transmitting of the information about the blockchain transaction based at least in part on receiving responses over the network connection from at least one of the one or more other online devices that indicates that the at least one second user has provided approval of the blockchain transaction that satisfies the one or more transaction criteria; and
  transmitting, by the online computing device and in response to the determining, the information about the blockchain transaction to the one or more blockchain storage nodes of the blockchain storage system.

A27. The computer-implemented method of clause A26 wherein the one or more second users include multiple second users, and wherein the one or more transaction criteria indicate a subset of the first user and the multiple second users whose approvals of the blockchain transaction are sufficient to satisfy the one or more transaction criteria if obtained by a specified deadline.

A28. The computer-implemented method of any one of clauses A01-A27 wherein the one or more private encryption keys are associated with a user, wherein the method further comprises obtaining additional information from the user to verify an identity of the user, and wherein the generating of the at least one transaction approval code is performed based in part on the obtaining of the additional information from the user.

A29. The computer-implemented method of any one of clauses A01-A28 wherein the one or more private encryption keys are associated with a user, and wherein the method further comprises:
  obtaining, by the offline computing device, information related to the user obtaining access to restricted functionality available via an other computing device;
  generating, by the offline computing device and using at least one of the one or more private encryption keys, cryptographically signed information corresponding to the access to the restricted functionality;
  generating, by the offline computing device, at least one access code that encodes data including the cryptographically signed information; and
  providing, by the offline computing device, the at least one access code for scanning by the other computing device, to cause the other computing device to obtain the data about the cryptographically signed information and to provide the access to the restricted functionality to the user.

A30. The computer-implemented method of any one of clauses A01-A29 wherein the blockchain transaction includes at least one of sending a first specified amount of a cryptographic coin to a cryptographic wallet of a user or of receiving a second specified amount of the cryptographic coin to the cryptographic wallet, and wherein the offline computing device is a smartphone with networking and electronic communication capabilities disabled.

A31. A computer-implemented method comprising multiple steps to perform automated operations that implement described techniques substantially as disclosed herein.

B01. A non-transitory computer-readable medium having stored executable software instructions and/or other stored contents that cause one or more computing systems to perform automated operations that implement the method of any of clauses A01-A31.

B02. A non-transitory computer-readable medium having stored executable software instructions and/or other stored contents that cause one or more computing systems to perform automated operations that implement described techniques substantially as disclosed herein.

C01. One or more computing systems comprising one or more hardware processors and one or more memories with stored instructions that, when executed by at least one of the one or more hardware processors, cause the one or more computing systems to perform automated operations that implement the method of any of clauses A01-A31.

C02. One or more computing systems comprising one or more hardware processors and one or more memories with stored instructions that, when executed by at least one of the one or more hardware processors, cause the one or more computing systems to perform automated operations that implement described techniques substantially as disclosed herein.

D01. A computer program adapted to perform the method of any of clauses A01-A31 when the computer program is run on a computer.

Aspects of the present disclosure are described herein with reference to flowchart illustrations and/or block diagrams of methods, apparatus (systems/devices), and computer program products according to embodiments of the present disclosure. It will be appreciated that each block of the flowchart illustrations and/or block diagrams, and combinations of such blocks, can be implemented by computer-readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
   obtaining, by a first computing device having a network connection to other computing systems, information regarding a blockchain transaction to complete;
   generating, by the first computing device, at least one transaction data QR (quick response) code that encodes data about the blockchain transaction;
   obtaining, by a second computing device that is not connected to any other computing devices via any wired or wireless connections, the data about the blockchain transaction by scanning the at least one transaction data QR code;
   retrieving, by the second computing device, one or more private encryption keys that are not accessible to the first computing device, and using at least one of the retrieved one or more private encryption keys to cryptographically sign the blockchain transaction;
   generating, by the second computing device, at least one transaction approval QR code that encodes data about the cryptographically signed blockchain transaction;
   obtaining, by the first computing device, the data about the cryptographically signed blockchain transaction by scanning the at least one transaction approval QR code; and
   transmitting, by the first computing device and using the network connection, information about the blockchain transaction to one or more blockchain storage nodes of a blockchain storage system, to cause the blockchain storage system to confirm the blockchain transaction.

2. The computer-implemented method of claim 1 wherein the one or more private encryption keys are controlled by a user, wherein the second computing device is an offline computing device that is in use by the user and that stores the one or more private encryption keys and that performs the scanning of the at least one transaction data QR code under control of the user and that displays the generated at least one transaction approval QR code on a display screen of the second computing device, and wherein the first computing device is an online computing device that is also in use by the user and that receives the obtained information regarding the blockchain transaction from the user via one or more interactions of the user with the first computing device and that displays the generated at least one transaction data QR code on a display screen of the first computing device and that performs the scanning of the at least one transaction approval QR code under control of the user.

3. The computer-implemented method of claim 1 wherein the generating of the at least one transaction data QR code is performed by automated operations of a first component of an Offline Wallet Management (OWM) system executing on the first computing device, wherein the generating of the at least one transaction approval QR code is performed by automated operations of a second component of the OWM system executing on the second computing device, and wherein the method further comprises:
   obtaining, by the second computing device as part of the automated operations of the second component of the OWM system, and after the obtaining of the data about the blockchain transaction and before the generating of the at least one transaction approval QR code, information from a user via one or more first interactions with the second computing device to approve the blockchain transaction; and
   obtaining, by the first computing device as part of the automated operations of the first component of the OWM system, and after the obtaining of the data about the cryptographically signed blockchain transaction and before the transmitting of the information about the blockchain transaction, information from the user via one or more second interactions with the first computing device to confirm the blockchain transaction.

4. The computer-implemented method of claim 1 wherein the retrieving of the one or more private encryption keys includes scanning, by the second computing device and under control of a user that controls the one or more private encryption keys, at least one private key QR code of a paper cryptographic wallet that is not accessible to any other computing devices, and further includes storing, by the second computing device, a temporary copy of the one or more private encryption keys on the second computing device, and wherein the method further comprises deleting, by the second computing device, and after cryptographic signing of the blockchain transaction by the second computing device and before the scanning of the at least one transaction approval QR code by the first computing device, the stored temporary copy of the one or more private encryption keys from the second computing device.

5. The computer-implemented method of claim 1 wherein the first and second computing devices are in use by a first user, wherein the obtaining of the information regarding the blockchain transaction includes receiving information indicating that the blockchain transaction is a multi-party transaction involving one or more second users and indicating one or more transaction criteria to be satisfied in order to complete the blockchain transaction, and wherein the method further comprises:
  interacting, by the first computing device and using the network connection, with one or more online devices of the one or more second users in order to obtain approval of the blockchain transaction by at least one of the one or more second users that satisfies the one or more transaction criteria; and
  determining, by the first computing device, to perform the transmitting of the information about the blockchain transaction based at least in part on receiving responses over the network connection from at least one of the one or more online devices that indicate that the at least one second user has provided approval of the blockchain transaction that satisfies the one or more transaction criteria.

6. A non-transitory computer-readable medium having stored contents that cause one or more computing devices to perform automated operations, the automated operations including at least:
  obtaining, by one of the one or more computing devices that is an offline computing device not connected to any other computing devices via any wired or wireless connections, data about a blockchain transaction to be completed by scanning at least one provided transaction data code that encodes data about the blockchain transaction;
  retrieving, by the offline computing device, one or more private encryption keys that are not accessible to any computing devices having a network connection to other computing devices, and using at least one of the retrieved one or more private encryption keys to cryptographically sign the blockchain transaction;
  generating, by the offline computing device, at least one transaction approval code that encodes data about the cryptographically signed blockchain transaction; and
  providing, by the offline computing device, the at least one transaction approval code for scanning by an online computing device having a network connection to other computing systems, to cause the online computing device to obtain the data about the cryptographically signed blockchain transaction and to transmit information about the blockchain transaction to a blockchain storage system.

7. The non-transitory computer-readable medium of claim 6 wherein the at least one provided transaction data code is a first QR (quick response) code displayed on a display screen of the online computing device, and wherein the provided at least one transaction approval code is a second QR code displayed on a display screen of the offline computing device.

8. The non-transitory computer-readable medium of claim 6 wherein the one or more computing devices further include the online computing device, and wherein the stored contents include software instructions that, when executed, cause the online computing device to perform further automated operations including:
  obtaining, by the online computing device, information regarding the blockchain transaction;
  generating, by the online computing device, the at least one transaction data code in response to the obtaining of the information;
  providing, by the online computing device, the generated at least one transaction data code for the scanning by the offline computing device;
  obtaining, by the online computing device, the data about the cryptographically signed blockchain transaction by scanning the provided at least one transaction approval code; and
  transmitting, by the online computing device and using the network connection, information about the blockchain transaction to one or more blockchain storage nodes of a blockchain storage system, to cause the blockchain transaction to be confirmed by the blockchain storage system.

9. The non-transitory computer-readable medium of claim 6 wherein the automated operations further include obtaining, by the offline computing device and before the generating of the at least one transaction approval code, approval information for the blockchain transaction from a user via one or more interactions with the offline computing device, and wherein the generating of the at least one transaction approval code is performed in response to the obtaining of the approval information.

10. The non-transitory computer-readable medium of claim 6 wherein the retrieving of the one or more private encryption keys includes scanning, by the offline computing device and under control of a user associated with the one or more private encryption keys, at least one private key code of at least one paper cryptographic wallet that is not accessible to any other computing devices, and includes storing, by the offline computing device, a temporary copy of the one or more private encryption keys on the offline computing device, and wherein the automated operations further include deleting, by the offline computing device, and after cryptographic signing of the blockchain transaction by the offline computing device and before scanning of the at least one transaction approval code by the online computing device, the stored temporary copy of the one or more private encryption keys from the offline computing device.

11. The non-transitory computer-readable medium of claim 10 wherein the at least one private encryption key is a single private encryption key that is distributed across multiple private keys codes that are multiple distinct QR (quick response) codes, and wherein the scanning of the at least one private key code includes scanning the multiple QR codes and combining data encoded in the multiple QR codes to recover the single private encryption key.

12. The non-transitory computer-readable medium of claim 6 wherein the offline computing device is used by a first user, wherein the blockchain transaction is a multi-party transaction involving one or more second users separate from the first user and indicating one or more transaction criteria to be satisfied in order to complete the blockchain transaction, wherein the online computing device is another of the one or more computing devices, and wherein the automated operations further include:
  interacting, by the online computing device and using the network connection, with one or more other online devices of the one or more second users in order to obtain approval of the blockchain transaction by at least one of the one or more second users that satisfies the one or more transaction criteria;

determining, by the online computing device, to perform transmitting of the information about the blockchain transaction based at least in part on receiving responses over the network connection from at least one of the one or more other online devices that indicates that the at least one second user has provided approval of the blockchain transaction that satisfies the one or more transaction criteria; and transmitting, by the online computing device and in response to the determining, the information about the blockchain transaction to the one or more blockchain storage nodes of the blockchain storage system.

13. The non-transitory computer-readable medium of claim 12 wherein the one or more second users include multiple second users, and wherein the one or more transaction criteria indicate a subset of the first user and the multiple second users whose approvals of the blockchain transaction are sufficient to satisfy the one or more transaction criteria if obtained by a specified deadline.

14. The non-transitory computer-readable medium of claim 6 wherein the one or more private encryption keys are associated with a user, wherein the automated operations further include obtaining additional information from the user to verify an identity of the user, and wherein the generating of the at least one transaction approval code is performed based in part on the obtaining of the additional information from the user.

15. The non-transitory computer-readable medium of claim 6 wherein the one or more private encryption keys are associated with a user, and wherein the automated operations further include:
  obtaining, by the offline computing device, information related to the user obtaining access to restricted functionality available via an other computing device;
  generating, by the offline computing device and using at least one of the one or more private encryption keys, cryptographically signed information corresponding to the access to the restricted functionality;
  generating, by the offline computing device, at least one access code that encodes data including the cryptographically signed information; and
  providing, by the offline computing device, the at least one access code for scanning by the other computing device, to cause the other computing device to obtain the data about the cryptographically signed information and to provide the access to the restricted functionality to the user.

16. The non-transitory computer-readable medium of claim 6 wherein the blockchain transaction includes at least one of sending a first specified amount of a cryptographic coin to a cryptographic wallet of a user or of receiving a second specified amount of the cryptographic coin to the cryptographic wallet, and wherein the offline computing device is a smartphone with networking and electronic communication capabilities disabled.

17. A computer-implemented method comprising:
  obtaining, by a first online computing device of a user that has an active network connection to other computing systems, information from the user regarding a blockchain transaction to complete;
  generating, by the first online computing device, at least one transaction data QR (quick response) code that encodes data about the blockchain transaction, including displaying the at least one transaction data QR code on a display screen of the first online computing device;
  obtaining, by a second offline second computing device of the user that is not connected to any other computing devices via any wired or wireless connections, the data about the blockchain transaction by scanning, under control of the user, the at least one transaction data QR code displayed on the display screen of the first online computing device;
  retrieving, by the second offline computing device, one or more private encryption keys of the user that are stored on the second offline computing device and are not accessible to any other computing devices, and using at least one of the retrieved one or more private encryption keys to cryptographically sign the blockchain transaction;
  generating, by the second offline computing device, at least one transaction approval QR code encoding data that includes the cryptographically signed blockchain transaction, including displaying the at least one transaction approval QR code on a display screen of the second offline computing device;
  obtaining, by the first online computing device, the data including the cryptographically signed blockchain transaction by scanning, under control of the user, the at least one transaction approval QR code displayed on the display screen of the second offline computing device; and
  transmitting, by the first online computing device and using the active network connection, information about the blockchain transaction to one or more blockchain storage nodes of a public blockchain storage system, to complete the blockchain transaction and cause the blockchain transaction to be confirmed by the public blockchain storage system based on actions of the first online computing device without having access to the at least one retrieved private encryption key used to cryptographically sign the blockchain transaction.

18. The computer-implemented method of claim 17 wherein the generating of the at least one transaction data QR code is performed by automated operations of a first component of an Offline Wallet Management (OWM) system executing on the first online computing device, wherein the generating of the at least one transaction approval QR code is performed by automated operations of a second component of the OWM system executing on the second offline computing device, and wherein the method further comprises:
  obtaining, by the second offline computing device as part of the automated operations of the second component of the OWM system, and after the obtaining of the data about the blockchain transaction and before the generating of the at least one transaction approval QR code, information from the user via one or more first interactions with the second offline computing device to approve the blockchain transaction; and
  obtaining, by the first online computing device as part of the automated operations of the first component of the OWM system, and after the obtaining of the data including the cryptographically signed blockchain transaction and before the transmitting of the information about the blockchain transaction, information from the user via one or more second interactions with the first online computing device to confirm the blockchain transaction.

19. The computer-implemented method of claim 18 further comprising:
  obtaining, by the second offline computing device and before the retrieving of the one or more private encryption keys, the one or more private encryption keys of the user by scanning, under control of the user, at least one private key QR code of a paper cryptographic wallet that is not accessible to any other computing devices;

storing, by the second offline computing device, a temporary copy of the one or more private encryption keys on the second offline computing device; and deleting, by the second offline computing device, and after cryptographic signing of the blockchain transaction by the offline device and before the generating of the at least one transaction approval QR code, the stored temporary copy of the one or more private encryption keys from the second offline computing device, and wherein the retrieved one or more private encryption keys of the user are from the temporary copy stored on the second offline computing device.

20. The computer-implemented method of claim 18 wherein the obtaining of the information from the user regarding the blockchain transaction includes receiving information indicating that the blockchain transaction is a multi-party transaction involving one or more other users and indicating one or more transaction criteria to be satisfied in order to complete the blockchain transaction, and wherein the method further comprises:

interacting, by the first online computing device and using the active network connection, with one or more other online devices of the one or more other users in order to obtain approval of the blockchain transaction by at least one of the one or more other users that satisfies the one or more transaction criteria; and determining, by the first online computing device, to perform the transmitting of the information about the blockchain transaction based at least in part on receiving responses over the active network connection from at least one of the one or more other online devices that indicates that the at least one other user has provided approval of the blockchain transaction that satisfies the one or more transaction criteria.

* * * * *